(12) United States Patent
Dean et al.

(10) Patent No.: US 12,449,346 B2
(45) Date of Patent: Oct. 21, 2025

(54) SYSTEM AND METHOD FOR IMAGING AND CLASSIFYING SMALL AQUATIC ORGANISMS

(71) Applicant: OceanSpace LLC, St Petersburg, FL (US)

(72) Inventors: Milton Dean, Palm Beach Gardens, FL (US); Eric Steimle, St Petersburg, FL (US); William Arnold, St Petersburg, FL (US)

(73) Assignee: OceanSpace LLC, St. Petersburg, FL (US)

( * ) Notice: Subject to any disclaimer, the term of this patent is extended or adjusted under 35 U.S.C. 154(b) by 0 days.

(21) Appl. No.: 18/839,533

(22) PCT Filed: Oct. 5, 2023

(86) PCT No.: PCT/US2023/034531
§ 371 (c)(1),
(2) Date: Aug. 19, 2024

(87) PCT Pub. No.: WO2024/076668
PCT Pub. Date: Apr. 11, 2024

(65) Prior Publication Data
US 2025/0244225 A1      Jul. 31, 2025

Related U.S. Application Data

(60) Provisional application No. 63/378,468, filed on Oct. 5, 2022.

(51) Int. Cl.
*G06V 40/10*   (2022.01)
*G01N 15/0227*   (2024.01)
(Continued)

(52) U.S. Cl.
CPC ..... *G01N 15/1434* (2013.01); *G01N 15/0227* (2013.01); *G01N 15/1433* (2024.01);
(Continued)

(58) Field of Classification Search
None
See application file for complete search history.

(56) References Cited

U.S. PATENT DOCUMENTS

2007/0252990 A1* 11/2007 Grueger ............... G01J 3/06
356/301
2014/0245734 A1* 9/2014 Kim ................... E02F 3/435
91/399
(Continued)

*Primary Examiner* — Eileen M Adams
(74) *Attorney, Agent, or Firm* — Syam Anand

(57) ABSTRACT

Improved methods and systems for image acquisition of small aquatic organisms at high resolution are disclosed. The methods and systems disclosed herein provide taxonomical classification of the small aquatic organisms through captured images. They also provide a platform that allows easy extension and/or adaptation and/or customization of properties of the instrument for specific imaging and sampling requirements based on the environment where the sampling is done, the amount of water that requires to be sampled, the speed with which sampling needs to be carried out, and the specific nature of organisms that need to be sampled around or below a 50 mm size range.

8 Claims, 19 Drawing Sheets

(51) Int. Cl.
*G01N 15/1433* (2024.01)
*G01N 15/1434* (2024.01)
*G06V 10/764* (2022.01)
*G06V 20/05* (2022.01)
*H04N 23/51* (2023.01)
*H04N 23/56* (2023.01)
*A01K 61/90* (2017.01)
*G01N 15/14* (2006.01)
*G02B 5/02* (2006.01)

(52) U.S. Cl.
CPC ............ *G06V 10/764* (2022.01); *G06V 20/05* (2022.01); *G06V 40/10* (2022.01); *H04N 23/51* (2023.01); *H04N 23/56* (2023.01); *A01K 61/90* (2017.01); *G01N 2015/144* (2013.01); *G01N 2015/1486* (2013.01); *G01N 2015/1493* (2013.01); *G02B 5/0278* (2013.01)

(56) References Cited

U.S. PATENT DOCUMENTS

2020/0134773 A1\* 4/2020 Pinter ................ G01N 21/8806
2022/0322645 A1\* 10/2022 Martineau ................ G06T 7/97

\* cited by examiner

Front View

Back View

Left View

Right View

A-A-59326D
COUPLING HALVES, QUICK-DISCONNECT, CAM-LOCKING TYPE, GENERAL SPECIFICATION

| Nominal Size | Dimensions | | | | | | | | | |
|---|---|---|---|---|---|---|---|---|---|---|
| | A | B | C | D | E | F | G | H | J | K |
| ½ | 1.035 1.030 | 1.264 1.259 | .378 .372 | 0.09 | .471 .465 | 1.00 | 0.06 | 1.264 1.259 | .10 | .58 |
| ¾ | 1.035 1.030 | 1.264 1.259 | .378 .372 | 0.09 | .471 .465 | 1.00 | 0.06 | 1.264 1.259 | .10 | .58 |
| 1 | 1.144 1.139 | 1.446 1.441 | .378 .372 | 0.13 | .565 .559 | 1.32 | 0.09 | 1.446 1.441 | .10 | .58 |
| 1¼ | 1.388 1.383 | 1.792 1.787 | .441 .435 | 0.13 | .690 .684 | 1.56 | 0.12 | 1.792 1.787 | .13 | .58 |
| 1½ | 1.690 1.685 | 2.105 2.100 | .441 .435 | 0.13 | .690 .684 | 1.62 | 0.12 | 2.105 2.100 | .13 | .58 |
| 2 | 2.065 2.060 | 2.484 2.479 | .441 .435 | 0.13 | .848 .842 | 1.87 | 0.12 | 2.484 2.479 | .13 | .58 |
| 2½ | 2.545 2.540 | 2.985 2.980 | .441 .435 | 0.19 | .848 .842 | 1.94 | 0.12 | 2.985 2.980 | .16 | .75 |
| 3 | 3.202 3.197 | 3.604 3.599 | .503 .497 | 0.19 | .895 .889 | 2.00 | 0.12 | 3.604 3.599 | .16 | .75 |
| 4 | 4.307 4.302 | 4.708 4.703 | .503 .497 | 0.22 | .895 .889 | 2.07 | 0.12 | 4.708 4.703 | .22 | 1.00 |
| 6 | 6.362 6.357 | 6.929 6.924 | .659 .653 | 0.22 | .963 .957 | 2.25 | 0.12 | 6.929 6.924 | .25 | 1.00 |

Note: Dimensions are in inches; tolerance shall be ±.02 for two place decimals, ±.005 for three place decimals; angles ±2°, unless otherwise specified hereon.

SYSTEM AND METHOD FOR IMAGING AND CLASSIFYING SMALL AQUATIC ORGANISMS

PRIORITY PARAGRAPH

The Application claims priority to the U.S. provisional application 63/378,468 titled "System and method for imaging and classifying small aquatic organisms" filed on Oct. 5, 2022, and PCT application PCT/US23/34531 titled "System and method for imaging and classifying small aquatic organisms" filed on Oct. 5, 2023. Both applications are fully incorporated herein by reference.

TECHNICAL FIELD

The instant disclosure relates to imaging devices, and more particularly to a system and method for imaging and classifying small aquatic organisms.

BACKGROUND

The distribution and abundance of small aquatic organisms distribution is carefully and constantly monitored by numerous government, academic, and private industry entities for various purposes (e.g., U.S. Environmental Protection Agency Clean Water Act). Some of this is done for permitting purposes. For example, industrial facilities (e.g., fossil fuel-based energy production facilities) that utilize surface waters to cool their operating machinery (1,065 facilities) must monitor and report number and composition of small aquatic organisms entrained in cooling water stream as a condition of permit renewal. Monitoring agencies include industries and agricultural operations required or desiring to support healthy waterways, government agencies, academic institutions, and environmental consulting firms. The U.S. Department of Agriculture also works cooperatively with farmers to reduce runoff and resultant impacts through their voluntary National Water Quality Initiative (NWQI). Progress is monitored by repetitive sampling of physical, chemical, and biological attributes of the target location, with small aquatic organisms constituting a key component of the biological sampling regimen.

Small aquatic organisms are monitored utilizing a variety of techniques. The most common and historically utilized technique is net-based sampling followed by laboratory processing to assign and enumerate taxonomic categories. Moreover, net sampling and subsequent sample processing is laborious, time consuming and expensive. Similarly, annual entrainment monitoring at a single facility may be expensive. Thus, small aquatic organism monitoring needs to be modernized to simplify sample collection, reduce costs, and increase sample processing efficiency to strengthen and expedite the process.

In the present state of art, sample instruments are used to capture images of organisms. Such instruments are designed for capturing images of aquatic organisms with size more than 1 centimeter (such as, medium to large-sized fish). Thus, most available sampling instruments fail to capture images of small aquatic organisms in the size range of less than 50 mm. Even though some instruments cover the size range of small aquatic organisms, the functionality of such instruments is generally low and insufficient to make taxonomical identification of these small organisms in the size range of approximately 0.5 mm to about 50 mm in length and approximately 0.5 mm to 10 mm width.

Conventional instruments lack the use of color camera technology. Additionally, conventional instruments for image acquisition of small aquatic organisms are unable to operate with controlled continuous sample flow. Such instruments also lack facilities of use of connectors to external plumbing to adapt to specific needs and allow the flow of the sample into and out of the instrument. Another limitation is that imaged organisms are not easily captured following passage and it may be difficult to quantify volume of sampled water. Alternately, such instruments require preserved samples.

Additionally, the conventional instruments lack a flexibility for field or lab use. Finally, most image acquisition instruments fail to provide means for front-lighting and back-lighting, and instead, provide backlit/silhouette or laser-derived images and therefore fail to capture potentially diagnostic surface features.

Therefore, there is a need in the art for improved methods and systems for image acquisition of small aquatic organisms at high resolution. Further, there is a need in the present state of art for systems providing taxonomical classification of the small aquatic organisms through captured images. Further, there is a need for platform that allows easy extension and/or adaptation and/or customization of properties of the instrument for specific imaging and sampling requirements based on the environment where the sampling is done, the amount of water that requires to be sampled, the speed with which sampling needs to be carried out, and the specific nature of organisms that need to be sampled below a 50 mm size range.

SUMMARY

Disclosed herein an image acquisition system for environmental sampling of aquatic organisms. The image acquisition system could efficiently sample organisms less than approximately 50 mm in size. The image acquisition system may comprise a fluid flow chamber comprising an inlet port end and an outlet port end. In some embodiments, one or more transparent windows may be provided with the fluid flow chamber which may be positioned between the inlet port end and the outlet port end to view said aquatic organisms flowing through said fluid flow chamber. In an embodiment, a line scan camera is configured such that the line scan camera may scan and acquire images of said aquatic organisms through one of the transparent windows. This transparent window may be referred to as the proximal transparent window. The embodiment may also comprise an illuminating assembly comprising a first-surface mirror.

In some embodiments, the line scan camera is a colored line-scan camera that captures colored images of aquatic organisms flowing through a fluid flow chamber.

In some embodiments, the fluid flow chamber includes a short flow chamber and a long flow chamber to modulate and maintain the fluid flow rates within the fluid flow chamber.

In some embodiments, a diffuser element is connected to one of the transparent windows other than the proximal transparent window to create an even field of light falling on the transparent windows resulting in clear imaging of aquatic organisms through the proximal transparent window. In some embodiments, the diffuser element may be connected to a transparent window distal to the proximal window.

In some embodiments, the flow chamber includes a back light window placed in between the distal transparent window and said diffuser element, wherein said back light window provides a surface to the diffuser.

In some embodiments, the image acquisition system may comprise an illuminating assembly. The illuminating assembly includes a plurality of lighting assemblies, a plurality of clear windows to provide a reflection of said aquatic organisms passing through said fluid flow chamber, a line scan slot section, and a plurality of heat dissipators. In an additional embodiment, a method for environmental sampling and classifying aquatic organisms may be provided. The method may comprise the steps of viewing from a transparent window said aquatic organisms floating within a fluid stream flowing through said fluid flow chamber. In some embodiments, the method may include the step of scanning and acquiring images of said aquatic organisms using a line scan camera connected to said fluid flow chamber. In a further embodiment, classification of said aquatic organisms may be done based on the acquired images.

BRIEF DESCRIPTION OF THE DRAWINGS

The accompanying drawings, which are incorporated in and constitute a part of this disclosure, illustrate exemplary embodiments and, together with the description, explains the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Further, the phrases "in some embodiments," "in accordance with some embodiments," "in the embodiments shown," "in other embodiments," and the like mean a particular feature, structure, or characteristic following the phrase is included in at least one embodiment of the present disclosure and may be included in more than one embodiment. In addition, such phrases do not necessarily refer to the same embodiments or different embodiments. It is intended that the following detailed description be considered as exemplary only, with the true scope and spirit being indicated by the following claims.

Figure 1:
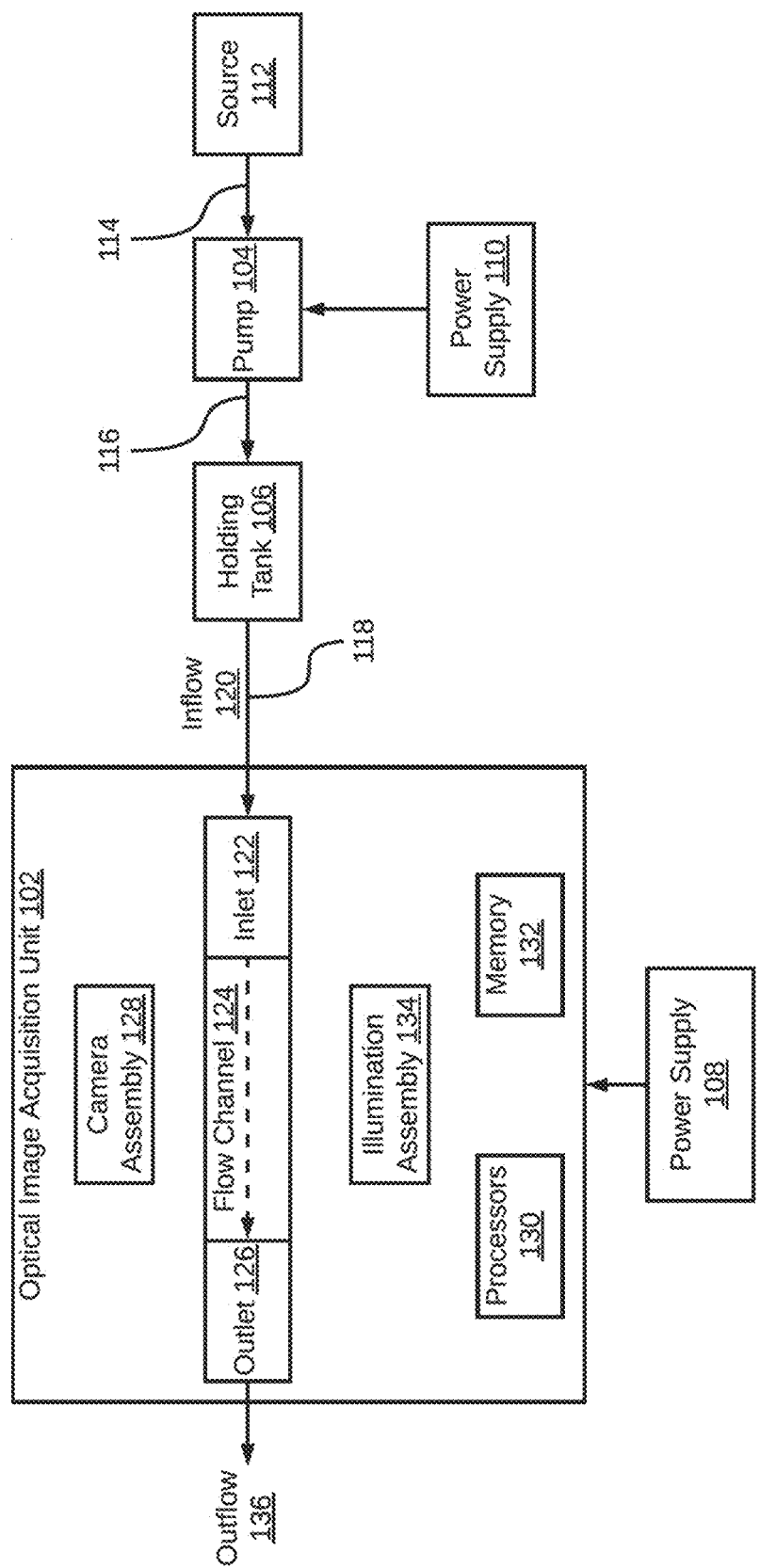
FIG. 1 illustrates an exemplary system for imaging and classifying small aquatic organisms in accordance with some embodiments of the present disclosure.

Referring now to FIG. 1, an exemplary system 100 for imaging and classifying small aquatic organisms is illustrated, in accordance with some embodiments of the present disclosure. The system 100 may include an optical image acquisition unit 102, a pump 104, and a holding tank 106. In some embodiments, the pump 104 may be a kind of a submersible pump, a centrifugal pump, diaphragm pump or a recirculating pump. The optical image acquisition unit 102 is powered by a power supply 108 and the pump 104 is powered by another power supply 110. The power supply may operate on the range of Direct Current inputs, for example from 10 v to 30 v or with an AC adapter. The power supply may be configured to make the unit more portable. Each of the power supply 108 and the power supply 110 may be internally regulated generators, rechargeable Lithium batteries, solar batteries, or the like. In some embodiments, the optical image acquisition unit 102 may be an internally powered equipment, thereby including the power supply 108 as an internal component.

The optical image acquisition unit 102 receives a sample including small aquatic organisms from a source 112. In some embodiments, the system 100 is implemented under in situ conditions, i.e., on-site. In such embodiments, the source 112 may be a water body such as, a well, a pond, a lake, a stream, seas, oceans, or the like. In some other embodiments, the system 100 is implemented under ex situ conditions, i.e., off-site. In such embodiments, the source 112 may be a storage tank storing a collected sample from any of the above mentioned water body sources. It may be noted that the optical image acquisition unit 102 is configured to capture images of small aquatic organisms present in the sample at a high resolution. The small aquatic organisms may range in size from about 0.5 mm to about 50 mm in length, and may range in diameter from about 0.5 mm to about 10 mm. More preferably, the small aquatic organisms may range in size from about 0.5 mm to about 10 mm in diameter. By way of an example, the small aquatic organisms may include, but not be limited to, Benthic insects, Benthic invertebrates, macro-zooplanktons, larval fish, plankton, nekton, benthos, phytoplankton and the like.

In an embodiment, the system 100 may operate entirely in an aquatic environment. For example, the aquatic environment may be, but may not be limited to a bed of a marine ecosystem such as, an ocean, a sea, coral reefs, mangrove forests, estuaries, or the like. In yet another embodiment, the inlet of the optical image acquisition unit 102 may be attached to a moving object (such as, a boat or a ship) and may collect the sample in real-time as the moving object traverses along the surface of the source 112. In such scenarios, the system 100 may or may not include the pump 104 and the holding tank 106. Other aquatic environments in which the embodiment may operate include backwaters, sounds, straits, bays, inlets, lakes, ponds, rivers, streams, creeks, swamps, bogs, and marshes.

The pump 104 may extract the sample from the source 112 through a pipe 114. In some embodiments, the pipe 114 may include a funnel or any other collecting device to collect a larger volume of sample. Further, the pump 104 delivers the sample to the holding tank 106 through a pipe 116. The holding tank 106 may store the sample. Additionally, the holding tank 106 may include releasing means that may allow the holding tank 106 to release the sample through a pipe 118. The released sample may be received by the optical image acquisition unit 102 as inflow 120. The releasing means may include a valve to regulate the inflow 120 of the sample into the optical image acquisition unit 102. Alternatively, the system 100 may include a valve in place of the holding tank 106. The valve may be opened to allow the inflow 120 of the sample into the optical image acquisition unit 102. Each of the pipes 114, 116, and 118 may be made of a piping material such as, but not limited to, polyvinyl chloride (PVC), High Density Polyethylene (HDPE), steel, copper, or the like. The piping may be flexible or rigid.

The optical image acquisition unit 102 may include a fluid inlet 122, a flow channel 124, fluid outlet 126, a camera assembly 128, one or more processors 130, a memory 132, and an illumination assembly 134. The fluid inlet 122 of the optical image acquisition unit 102 may receive the sample inflow 120 from the holding tank 106 flowing through conduit or flow line 118. Further, the sample inflow enters the flow channel 124, such that the flow channel is in linear connection with the sample inflow line 118 and the fluid sample is flowing within the optical image acquisition unit 102 through the flow channel. The flow channel 124 may be provided with an imaging section (not shown in FIG. 1), which may include mounting frames for mounting one or more windows for viewing aquatic organisms flowing through the flow channel 124. Thus, the imaging section may be placed external to the flow channel or within the flow channel. Each of the one or more windows may be made of a transparent material (e.g., a glass, or a transparent fiber sheet, etc.), that may allow the sample to be viewed while in motion along the flow channel 124. Non-limiting examples of transparent materials for the windows are abrasion-resistant coated acrylic or glass. Nano coatings for abrasion resistance and prevention of fouling may also be utilized in some embodiments. The imaging section is explained in detail in subsequent sections.

Further, the image acquisition unit 102, is provided with a camera assembly 128 including a camera with a lens. By way of an example, the camera may be a digital camera, or a line scan camera or an area scan camera or any industrial grade camera for scanning large objects, or a camera for continuous scanning of objects, or a high speed camera or a high resolution camera, etc. The camera assembly is arranged either perpendicular or parallel to the direction of the flow channel 124 within the image acquisition unit 102. The camera is required for acquiring accurate and useful images of the objects with sufficient details flowing through the fluid flow channel 124. Since the camera may be a large scale camera, therefore the camera may be used for obtaining images of larger objects. However, the lens of the camera assembly 128 may be a prime lens or a telecentric lens. It may be noted that the lens may provide higher resolution and magnification required to view small aquatic organisms. Further, the camera assembly 128 may include a mirror (e.g., a Single Lens Reflex (SLR) camera or a Digital Single Lens Reflex (DSLR) camera) or may not include a mirror (e.g., a mirrorless camera). It is to be noted that the line scan cameras are used to reduce the difference in resolution and light intensity between the center and the edge thereby reducing the image distortion. Ideally the line scan cameras are provided with a wide range of focal lengths to fulfill various imaging needs.

In some configurations or embodiments, a prismatic-film and/or micro-lens array may be used. A prismatic film is a thin plastic that works with the optical principle of total internal reflection (TIR) through the prism structure. Depending on the imager size and application a singular or a combination of prismatic films and micro-lens for collimating and focusing the light may be utilized in some embodiments.

Further, an illumination assembly 134 is provided within the same image acquisition unit 102 which may be placed opposite to the camera assembly and next to the flow channel as shown in FIG. 1. The illumination assembly may include an arrangement of one or more light assemblies around the imaging section to provide illumination and contrast to the inflow sample flowing through the flow channel 124. Each of the one or more light assemblies includes an array of Light Emitting Diodes (LEDs). In some embodiments, the illumination assembly 134 may include three light assemblies. In some embodiments, the illumination assembly 134 may include two light assemblies (i.e., front light assemblies) positioned on camera-facing side of the imaging section and one light assembly on opposite side of the imaging section (i.e., back light assembly). In an embodiment, the three light assemblies of the illumination assembly 134 may be positioned at an angle of about 60° from each other, forming an equilateral triangle around the imaging section. In another embodiment, the arrangement of the three light assemblies of the illumination assembly 134 around the imaging section may form an isosceles triangle, with the back light assembly being equidistant from the two front light assemblies.

When the sample flows through the imaging section, any aquatic organism present in the sample may reflect light from the illumination assembly 134 via specular reflection. The camera assembly 128 is positioned within the optical image acquisition unit 102 in a way that the reflected light from the imaging section may be directed towards the camera, such that the camera is able to capture high resolution images of the sample flowing through the imaging section. Further, the sample may flow out of the optical image acquisition unit 102 as outflow 136 through the outlet 126.

In an embodiment, the optical image acquisition unit 102 may include a display (not shown in figure). The display may be a touch screen, LED screen, an LCD screen, a monitor, or the like. The display may show images captured by the camera assembly in real-time to a user operating the optical image acquisition unit 102. Further, the display may include a User Interface (UI) through which the user may interact with the optical image acquisition unit 102, for example, by sending an input command and receiving a corresponding output response. Additionally, the UI may provide a preview to the user so that the user may identify potential image quality based on camera settings and may alter the camera settings to obtain better quality images. Examples of camera settings may include, but may not be limited to camera orientation settings, camera zoom and focus settings, alternate camera mode settings (e.g., scan rate and gain), and the like.

The one or more processors 130 of the optical image acquisition unit 102 may be communicatively coupled to the memory 132 which may be a non-volatile memory or a volatile memory. Examples of non-volatile memory may include, but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random Access Memory (DRAM), and Static Random-Access Memory (SRAM). The memory 132 may store instructions that, when executed by the processor 130, may cause the processor 130 to capture and classify images of small aquatic organisms. The memory 132 may also store various data (e.g., image data, classification model, taxonomic classes of the small aquatic organisms, etc.) that may be captured, processed, and/or required by the optical image acquisition unit 102. One exemplary embodiment has 1 to 10 TB solid state disk (SSD) drive. It may be placed within the imaging unit or kept external via a connector such as USB3.

The system 100 may also include one or more external devices (not shown in figure). In some embodiments, the optical image acquisition unit 102 may interact with the one or more external devices over a communication network for sending or receiving various data. Examples of the external devices may include, but not limited to, computer, tablet, smartphone, and laptop. The communication network, for example, may be any wired or wireless network and the examples may include, but may not be limited to, the Internet, Wireless Local Area Network (WLAN), Wi-Fi, Long Term Evolution (LTE), Worldwide Interoperability for Microwave Access (WiMAX), and General Packet Radio Service (GPRS). One exemplary embodiment uses Starlink. 47. Further, the optical image acquisition unit 102 may thus classify the small aquatic organisms in the captured images. The classification may be a taxonomical classification based on morphological features of the small aquatic organisms. The classification may be performed through a supervised machine learning (ML) model based on one or more classification algorithms such as, but not limited to Logistic Regression, Naïve Bayes, K-Nearest Neighbors (KNN), Decision Tree, Support Vector Machines, Artificial Neural Network (ANN), Deep Neural Network, or the like. The ML model may be trained based on a digital image dataset that may or may not be specific to aquatic organisms. In an embodiment, the ML model may be stored in the memory 132 of the optical image acquisition unit 102. In an alternate embodiment, the ML model may be stored in at least one of the one or more external devices communicatively connected to the optical image acquisition unit 102.

In an exemplary scenario, the ML model may receive an image from the camera assembly 128. Further, the ML model may extract a set of features from the image. Further, the ML model may identify one or more aquatic organisms in the image. Additionally, the ML model may determine a taxonomic classification of each of the identified one or more aquatic organisms in the image. The classification reports will include identification, sizing, and counting. As will be appreciated, classification of aquatic organisms may facilitate monitoring and enumeration of various species present in aquatic ecosystems from a conservationist perspective. Additionally, the system 100 may allow monitoring presence or absence of certain small aquatic organisms that may be indicative of water pollution levels or ecological health of the aquatic ecosystem.

Figure 2A:
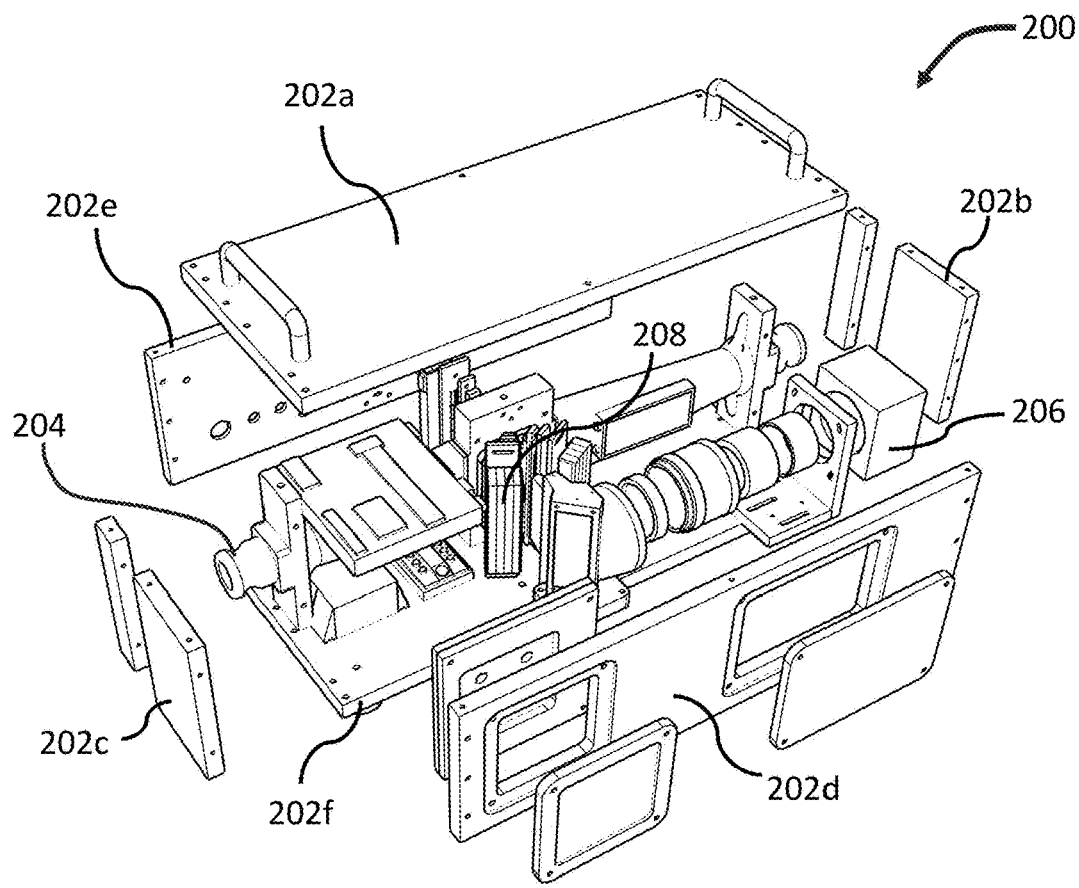
FIGS. 2A-B illustrate multiple views of an exemplary optical image acquisition unit, in accordance with an embodiment of the present disclosure.
Figure 2A:
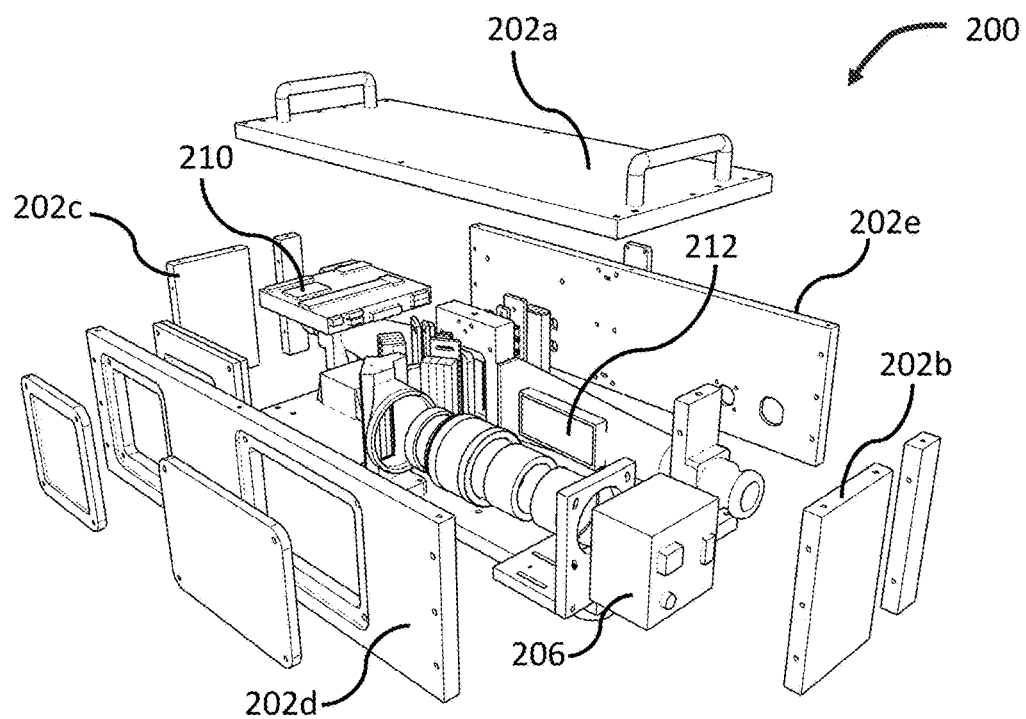
Figure 2B:
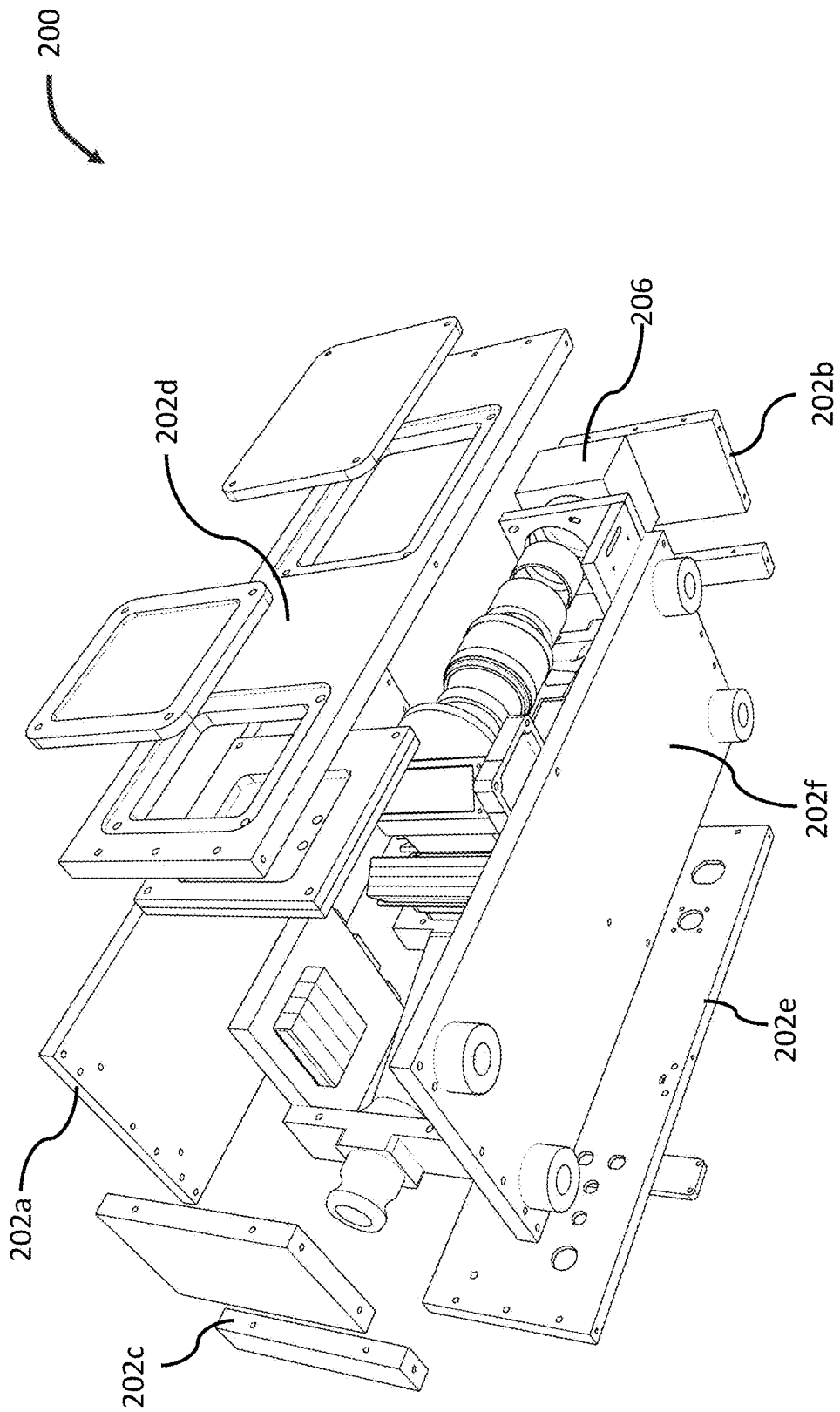

Referring now to FIGS. 2A-B, multiple views of an exemplary optical image acquisition unit 200 are illustrated, in accordance with an embodiment of the present disclosure. In an embodiment, the optical image acquisition unit 200 may be analogous to the optical image acquisition unit 102. The optical image acquisition unit 200 may include an enclosure. The enclosure may include a top wall 202a, side walls 202b, 202c, 202d, and 202e, and a bottom wall 202f. Further, the optical image acquisition unit 200 may include, within the enclosure, an imaging flow channel 204, a camera and lens assembly 206, and an illumination assembly 208. Outer side of the side walls 202b, 202c, 202d, and 202e of the enclosure 202 may include various panels and controls that are configurable by a user. The enclosure 202 may also include means (for example, hinge doors, sliding doors, etc.) to access internal components (such as, lens and mirror) for accessible repair and manual configurations. In some exemplary embodiments, stainless steel hardware was used to make the enclosure and a gasketing material was used on all joining surfaces to make the system weather and water resistant. In some embodiments, access to the means may require a password, key, biometric data, or the like, from a user operating the optical image acquisition unit 200 to unlock the means.

The imaging flow channel 204 may include an inlet and an outlet. The optical image acquisition unit 200 may receive the sample via the inlet of the imaging flow channel 204. Further, the imaging flow channel 204 may include an imaging section where the high-resolution images of the sample may be captured by the camera and lens assembly 206. It should be noted that the imaging section of the imaging flow channel 204 may be illuminated by the illumination assembly 208. The camera and lens assembly 206 may include a camera and a lens. The lens may be configured to provide an enhanced resolution of the small aquatic organisms in the sample that may be captured as a high-resolution image by the camera.

Further, the optical image acquisition unit 200 may include, within the enclosure, a Central Processing Unit (CPU) 210 that may be functionally analogous to the processor 122. By way of an example, the CPU 210 may be a Digital Signal Processor (DSP) such as an Image Processor Unit (IPU). The CPU 210 may be communicably coupled to and may interact with a memory (such as, ROM, PROM, EPROM, EEPROM, DRAM, SRAM, etc.). The CPU 210 may receive input images from the camera and lens assembly 206 and may perform additional processing of the captured images. Further, the processed images may be stored in the memory of the optical image acquisition unit 200. In an embodiment, the optical image acquisition unit 200 may include a display. Some embodiments may comprise a Graphic Process Unit (GPU) and/or a Deep Learning Accelerator (DLA) to process images.

Further, the optical image acquisition unit 200 may include, within the enclosure, a thermal management unit 212 for regulating temperature of the optical image acquisition unit 200. In some embodiments, when the temperature of the optical image acquisition unit 200 may exceed a predefined threshold temperature, the thermal management unit 212 may halt operations of the optical image acquisition unit 200 to prevent overheating. In some embodiments, the thermal management unit may comprise a metal thermal block with methods such as thermal straps to transfer heat from the CPU and the LEDs. It some embodiments, it also may comprise temperature measuring devices. It some embodiments, the temperature measuring devices may help the operator of the device to monitor the temperature of the unit and make decisions to operate, modify the operating parameters or shut down the unit.

The imaging flow channel 204 receives the sample from the source. The imaging flow channel 204 includes long and short flow chambers separated by an imaging and illumination section. In some embodiments, the chambers may be of equal length. The imaging and illumination section provides lighting to the sample via the illumination assembly 208. Further, images of the sample are captured in the imaging and illumination section through the camera and lens assembly 206. This is further explained in greater detail in conjunction with FIGS. 3-13.

Figure 3A:
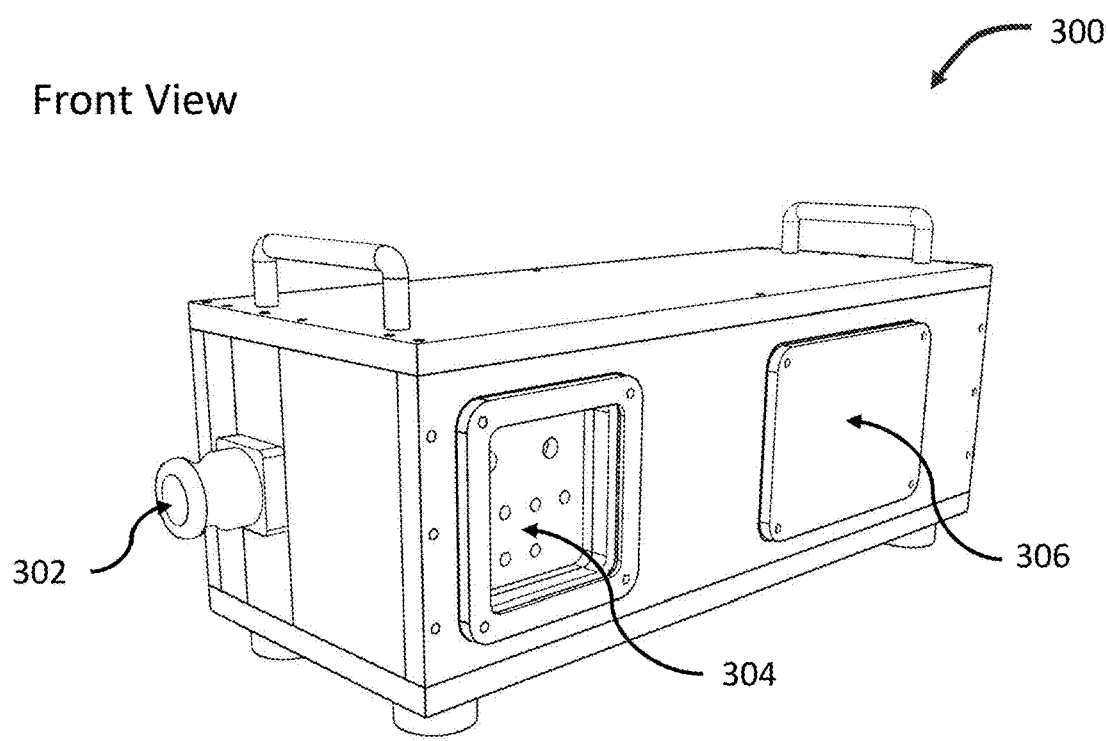
FIGS. 3A-C illustrate multiple views of an exemplary enclosure of an optical image acquisition unit, in accordance with an embodiment of the present disclosure.
Figure 3A:
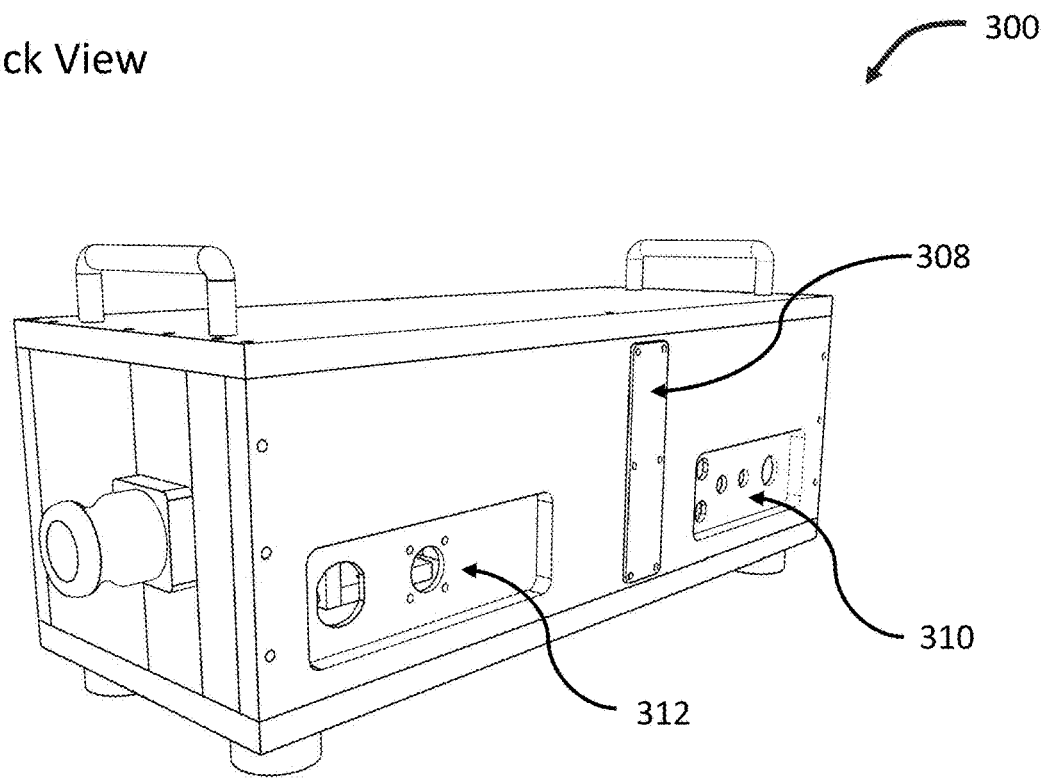
Figure 3B:
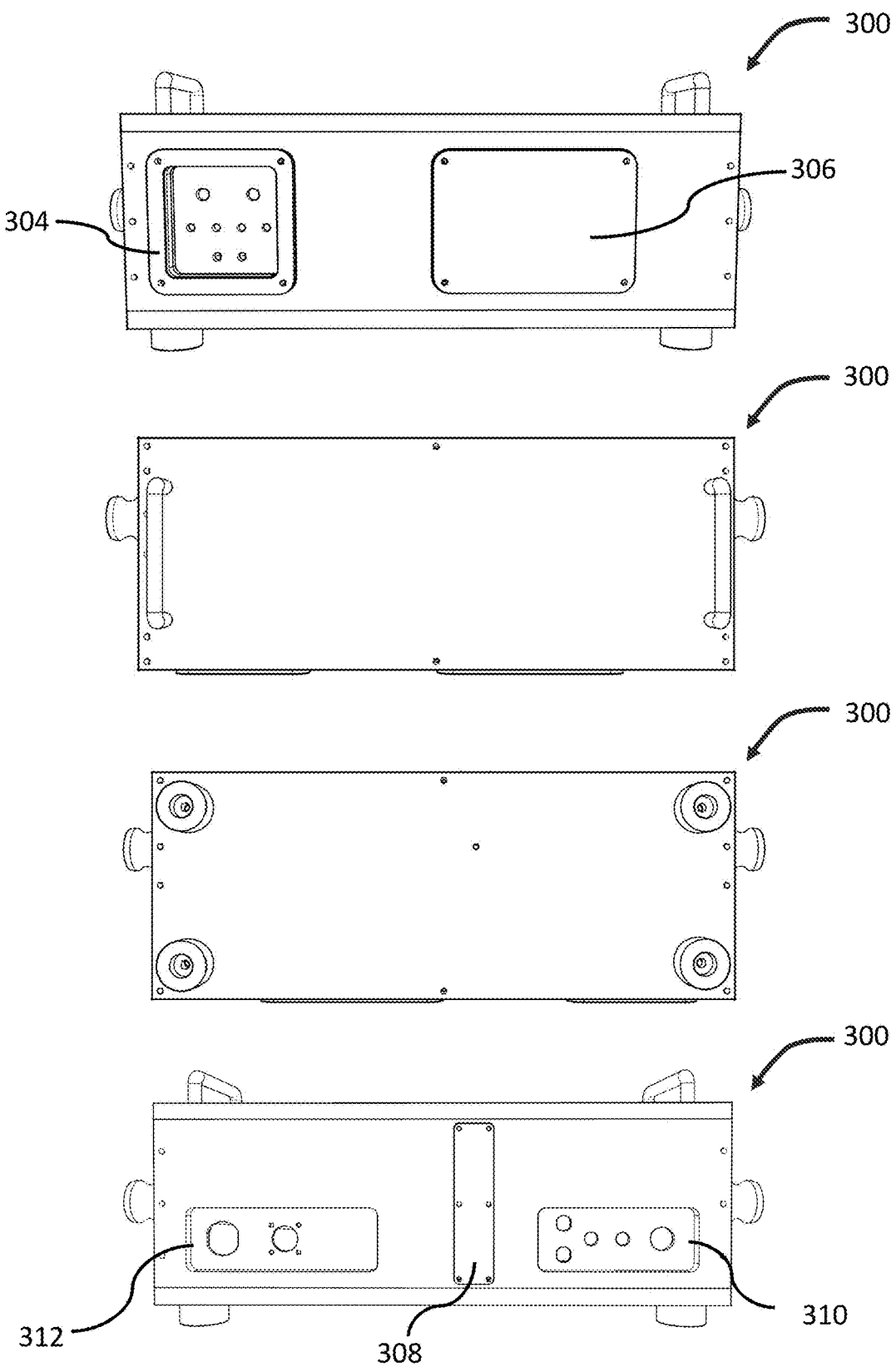
Figure 3C:
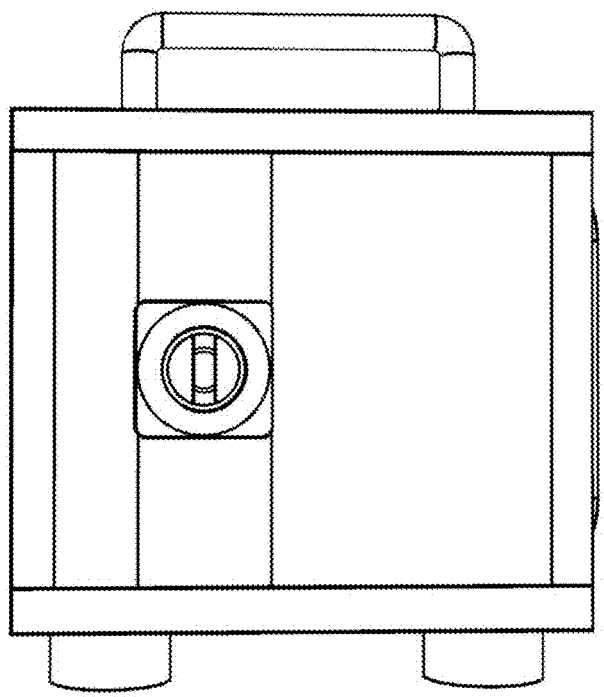
Figure 3C:
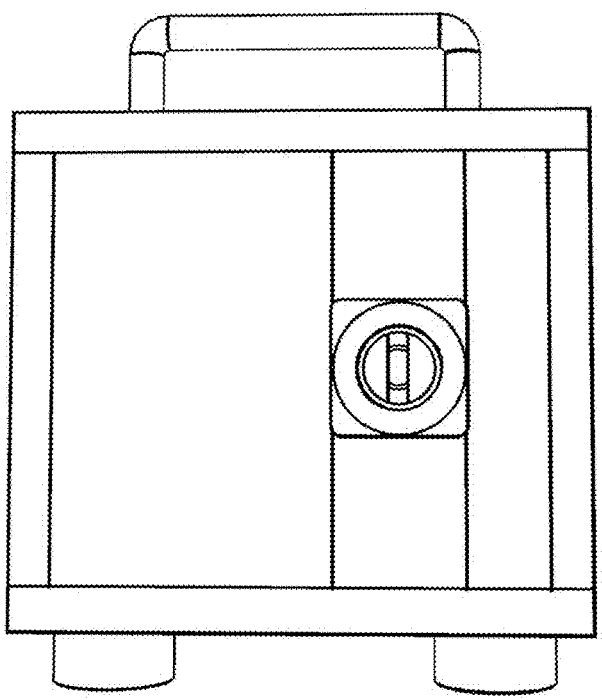

Referring now to FIGS. 3A-C, multiple views of an exemplary enclosure 300 of an optical image acquisition unit (for example, the optical image acquisition unit 200) are illustrated, in accordance with an embodiment of the present disclosure. The enclosure 300 includes an imaging flow channel 302, a control panel 304, a lens access panel 306, a backlight adjustment access panel 308, a power panel 310, and a communications and accessory panel 312.

The lens access panel 306 provides access to adjust focus and F-stop. In some embodiments, the mounting adjustment stays fixed, but allows the user to adjust F-stop and focus if any fine tuning is needed. The lens access panel 306 may be covered or held on to the enclosure 300 by various methods such as, a hinged door. Additionally, the lens access panel 306 may be weather tight. In an embodiment, the lens access panel 306 includes a ⅜" PVC held on to the enclosure 300 with brass thumbscrews.

The control panel 304 may be used for LED intensity control. In an embodiment, the control panel 304 includes a switch for the LED lights in each of the back light assembly and the front light assembly in the illumination assembly. The control panel may contain three position LED switches for selection of manual control, automatic control by the processor software, or off. Further, the control panel 304 includes potentiometers for manual luminous intensity level control. The condition indicators for troubleshooting, may show whether the LED lights are disabled. This condition may be due to being switched off, or an over temperature thermal switch is activated, and if power supplies are on or off which may be due to main switch off, power disconnected, or fuse blown. It may be noted that the control panel 304 may be a removable clear panel, weather tight, and may be held or covered by a hinged door or other means. In an embodiment, the control panel 304 may include a ¼" PVC with ⅛" clear AR acrylic and a foam weather strip with brass thumb screws.

The power panel 310 includes two fuse holders for buck-boost 12 VDC converter and one fuse holder for a 10 to 30 VDC input power source. It may be noted that the power panel 310 may include input power jacks, fuses, and an input power on-off switch. In an embodiment, the power panel 310 may include 2.1 mm and 2.5 mm style DC power jacks, two fuses, and one rocker power switch.

The back light adjustment access panel 308 provides access for alignment of the back light assembly in the illumination assembly. In an embodiment, the back light adjustment access panel 308 may include ¼" PVC. The communications and accessory panel 312 may include a panel with various ports configured for adapting to Ethernet connection, HDMI, USB, or other accessories. In an embodiment, the communications and accessory panel 312 may include one Ethernet, one auxiliary connector for flow sensor. In another embodiment, the communications and accessory panel leaves space for additional connectors for custom applications.

Figure 4A:
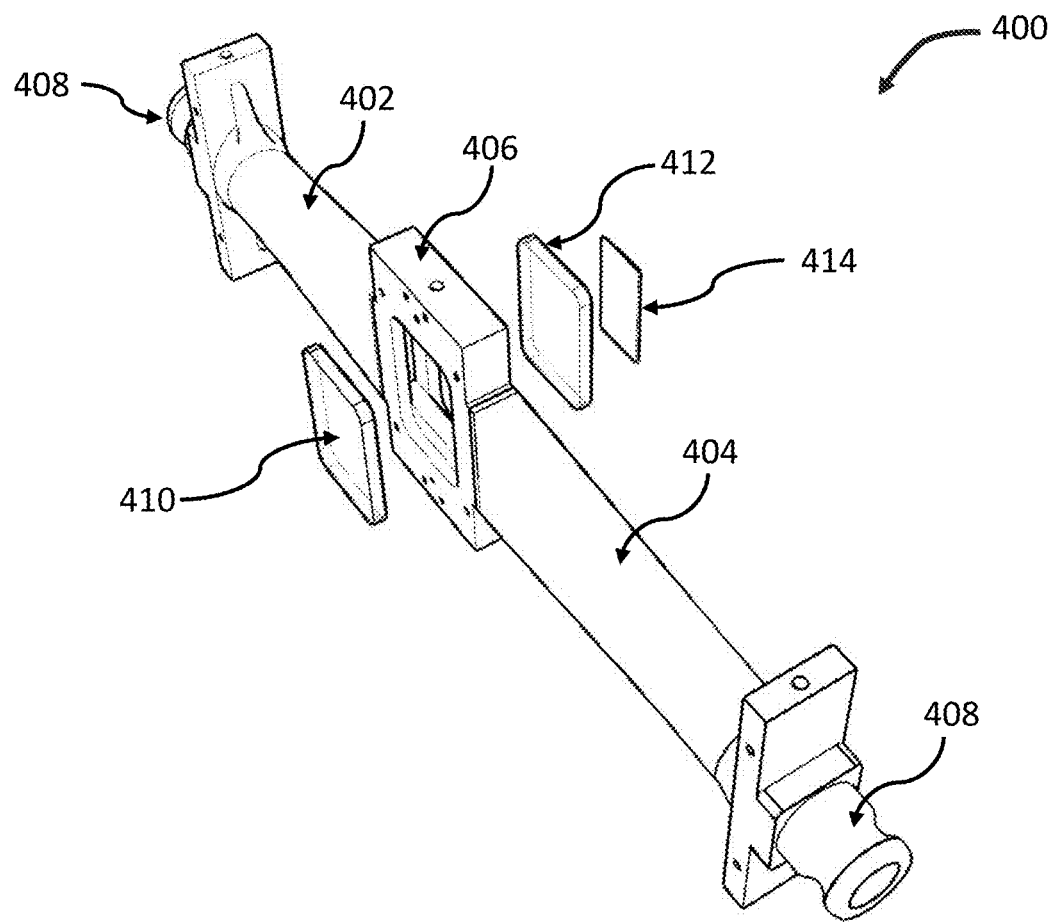
FIGS. 4A-B illustrate multiple views of an exemplary imaging flow chamber of an optical image acquisition unit, in accordance with an embodiment of the present disclosure.
Figure 4A:
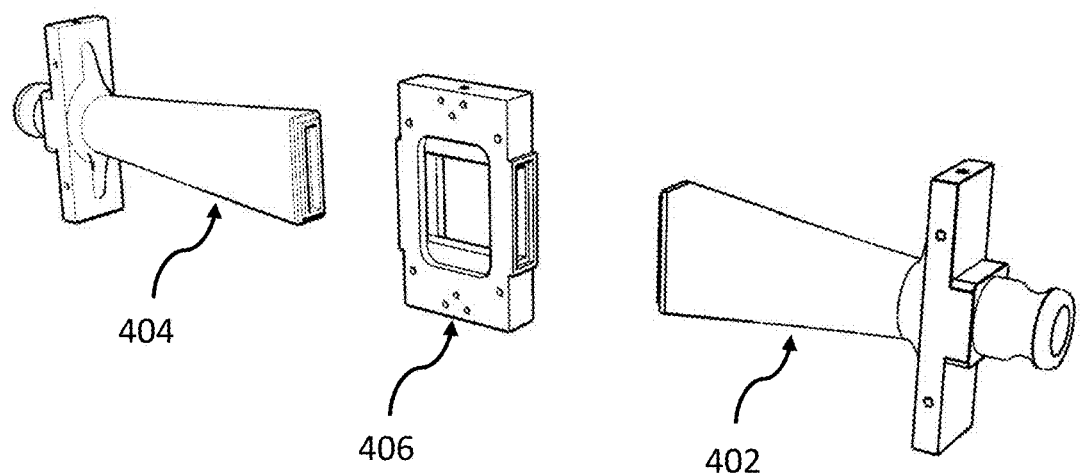
Figure 4B:
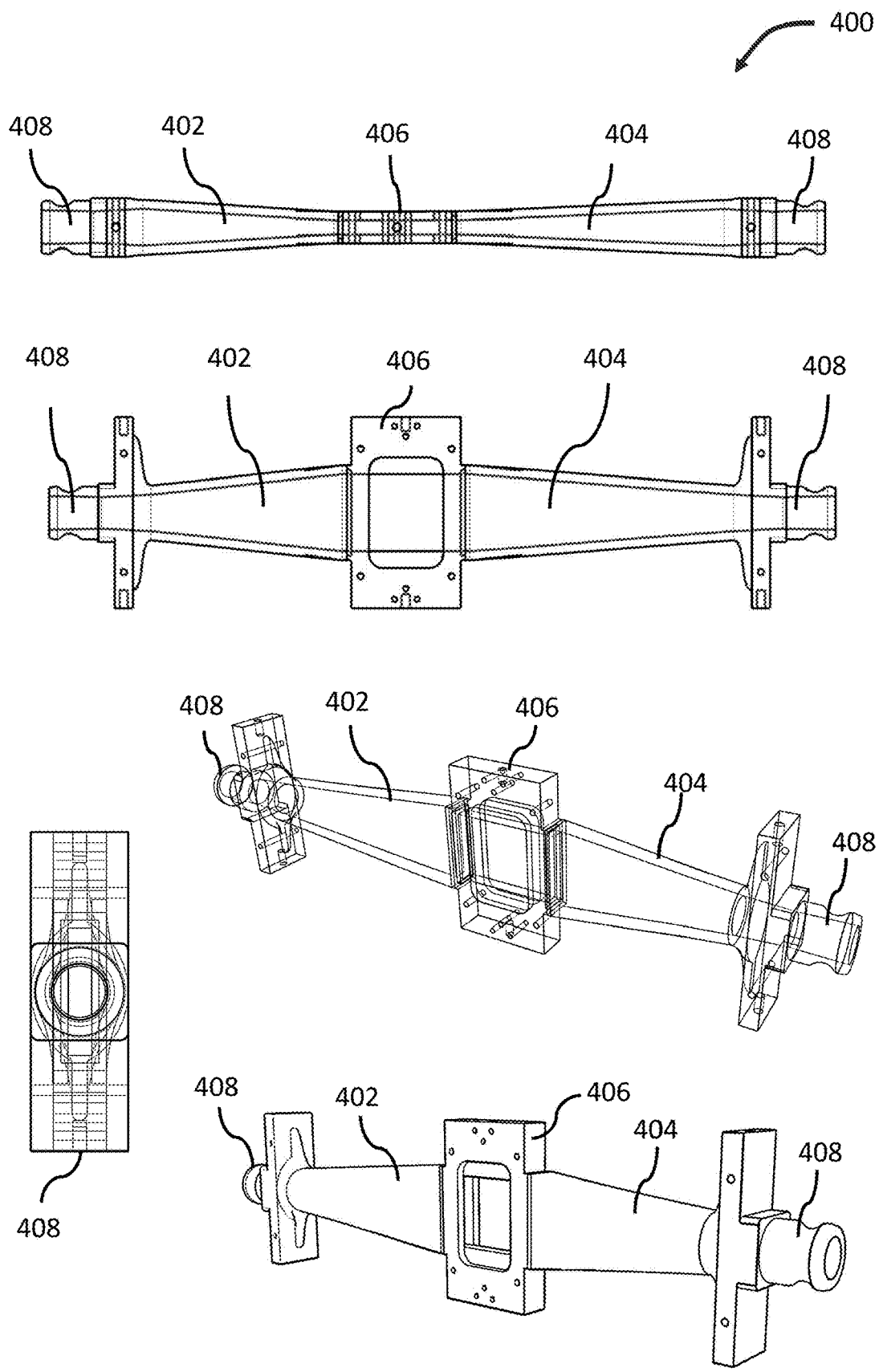

Referring now to FIGS. 4A-B, multiple views of an exemplary imaging flow chamber 400 of an optical image acquisition (for example, the optical image acquisition unit 200) are illustrated, in accordance with an embodiment of the present disclosure. The imaging flow chamber 400 includes a short flow chamber 402, a long flow chamber 404, an imaging and illumination section 406, and a port end 408. The imaging and illumination section 406 further includes a proximal window 410, a distal window 412, and a diffuser 414.

The short flow chamber 402 is a flow channel with a varying channel size. On one end of the short flow chamber 402 is a circular port and on the other end is a rectangular port. The rectangular port adjoins with the rectangular imaging and illumination section 406. It should be noted that the short flow chamber 402 maintains same internal cross-sectional area from the circular port to the rectangular port. In an embodiment, the short flow chamber 402 may include a 1" circular port and a 10 mm×53 mm rectangular port at the imaging and illumination section 406. The dimensions of the short flow chamber 402 may be 8.25"×5.25"×1.625".

The long flow chamber 404 is a longer side of the rectangular imaging and illumination section 406. The imaging flow chamber 400 requires a longer side to account for required focal length and placing of camera and related optical elements. The long flow chamber 404 is a flow channel with a varying channel size. On one end of the long flow chamber 404 is a circular port and on the other end is a rectangular port. The rectangular port adjoins with the rectangular imaging and illumination section 404. It should be noted that the long flow chamber 404 maintains same internal cross-sectional area from the circular port to the rectangular port. In an embodiment, the long flow chamber 404 may include a 1" circular port and a 10 mm×53 mm rectangular port at the imaging and illumination section 406. The dimensions of the long flow chamber 404 may be 10.5"×5.25"×1.625".

The imaging and illumination section 406 may be configured for mounting the proximal window 410, the distal window 412, and the diffuser 414. In an embodiment, the imaging and illumination section 406 may include various additional mounting holes to permit multiple configurations of lighting arrangement, holes for heat-staking 8-32 threaded inserts, and a nested slot fit bonded with 2-part epoxy. Dimensions of the imaging and illumination section 406 may be 5.25"×3.25"×0.875". The sample flowing through the imaging and illumination section 406 may be visible to a camera assembly. Therefore, images of the sample may be captured when the sample flows through the imaging and illumination section 406. Further, each of the short flow chamber 402, the long flow chamber 404, and the imaging and illumination section 406 may be adjoined in a water-tight manner to avoid leakage of the sample inside the optical image acquisition unit 200.

The proximal window 410 is an imaging window. The proximal window 410 may be an AR coated acrylic window or a glass window. Width of the proximal window 410 allows various front side lighting options for specular reflection. The proximal window 410 may be of diverse sizes depending on specific field of view requirements for the targeted organism size. In some embodiments, the proximal window 410 may be a nested fit, bonded with 2-part epoxy. In an embodiment, the proximal window 410 may be made of AR coated acrylic with dimensions of ¼"×3"×2"×½" covering a clear area of 2"×2".

The distal window 412 is a backlight window. The distal window 412 may be an AR coated acrylic window or a glass window. It should be noted that the distal window 412 provides surface for the diffuser 414 for backlight. Additionally, the distal window 412 may be of diverse sizes depending on specific field of view requirements for the targeted organism size. In an embodiment, the distal window 412 may be made of AR coated acrylic with dimensions of ¼"×3"×2"×½" covering a clear area of 2"×2".

The diffuser 414 is made of a moderate diffuser material. In some embodiments, the diffuser 414 may be used in combination with other diffusers and prismatic filters. The diffuser is attached to the distal window 412 with a double side clear tape on each edge (for example, 3M VHS double side clear tape). It must be noted that the double side clear tape is not in viewing area. In an embodiment, the diffuser 414 may be made of diffusion gels (for example, a tough white diffusion gel). The diffuser 414 may be a moderate diffuser that creates an even field of light with minimal color temperature shift and includes a tough, heat resistant base.

Figure 5:
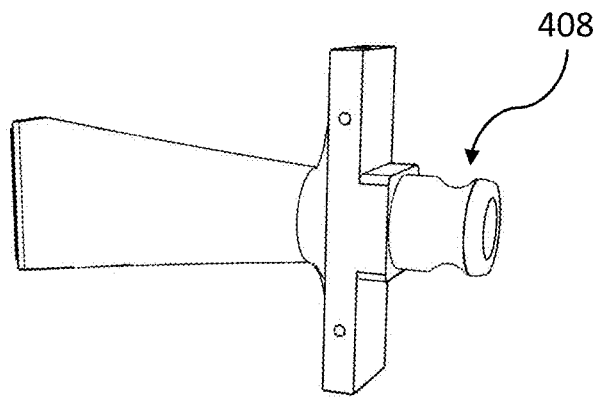
FIG. 5 illustrates an exemplary port end of an imaging flow chamber, in accordance with an embodiment of the present disclosure.
Figure 5:
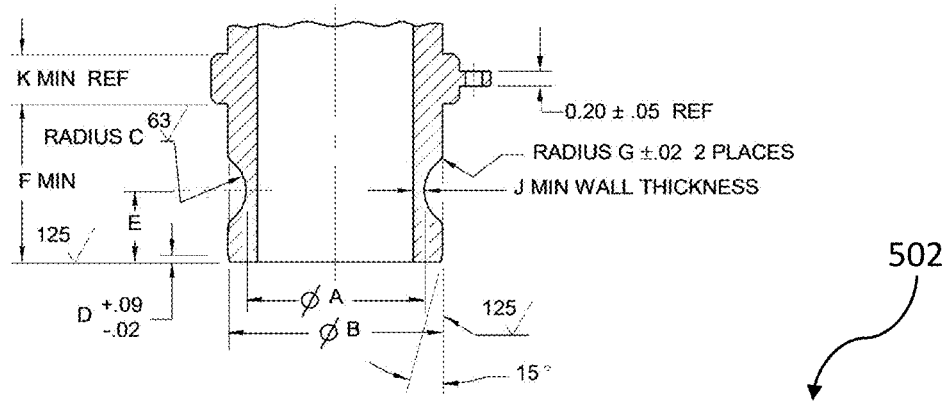

Referring now to FIG. 5, an exemplary port end 408 of the imaging flow chamber 400 is illustrated, in accordance with an embodiment of the present disclosure. The port end 408 may be used for interfacing to hose or pipe. The port end 408 may be of diverse sizes (for example, in a range of about ½" to about 2" inside diameter). Further, the port end 408 may include diverse sizes of pipe and hose interconnects (such as, slip-fit, unions, hose barbs, cam and groove, etc.). In some embodiments, the port end 408 may be printed as an integrated part with each of the short flow chamber and the long flow chamber. In some other embodiments, the port end 408 may be removably attached to each of the short flow chamber and the long flow chamber (e.g., through snap-fit, adjustment screws, latch locking, etc.). In yet some other embodiments, the port end 408 may be irreversibly attached to each of the short flow chamber and the long flow chamber (e.g., through welding, permanent adhesives, etc.).

In an embodiment, the port end 408 may be of 1" nominal size and may be 3D printed to be compliant with Commercial Item Description (CID) of A-A-59326 D 502 (FIG. 5). Dimensions for various other embodiments with other nominal sizes have been described in FIG. 5. Additional features of the port end 408 may include general specification for coupling halves, quick disconnect, and cam-locking type feature. Thus, the port end 408 allows for rapid connect and disconnect of external pipes to the optical image acquisition unit 200, thereby adding to portability of the optical image acquisition unit 200.

Figure 6:
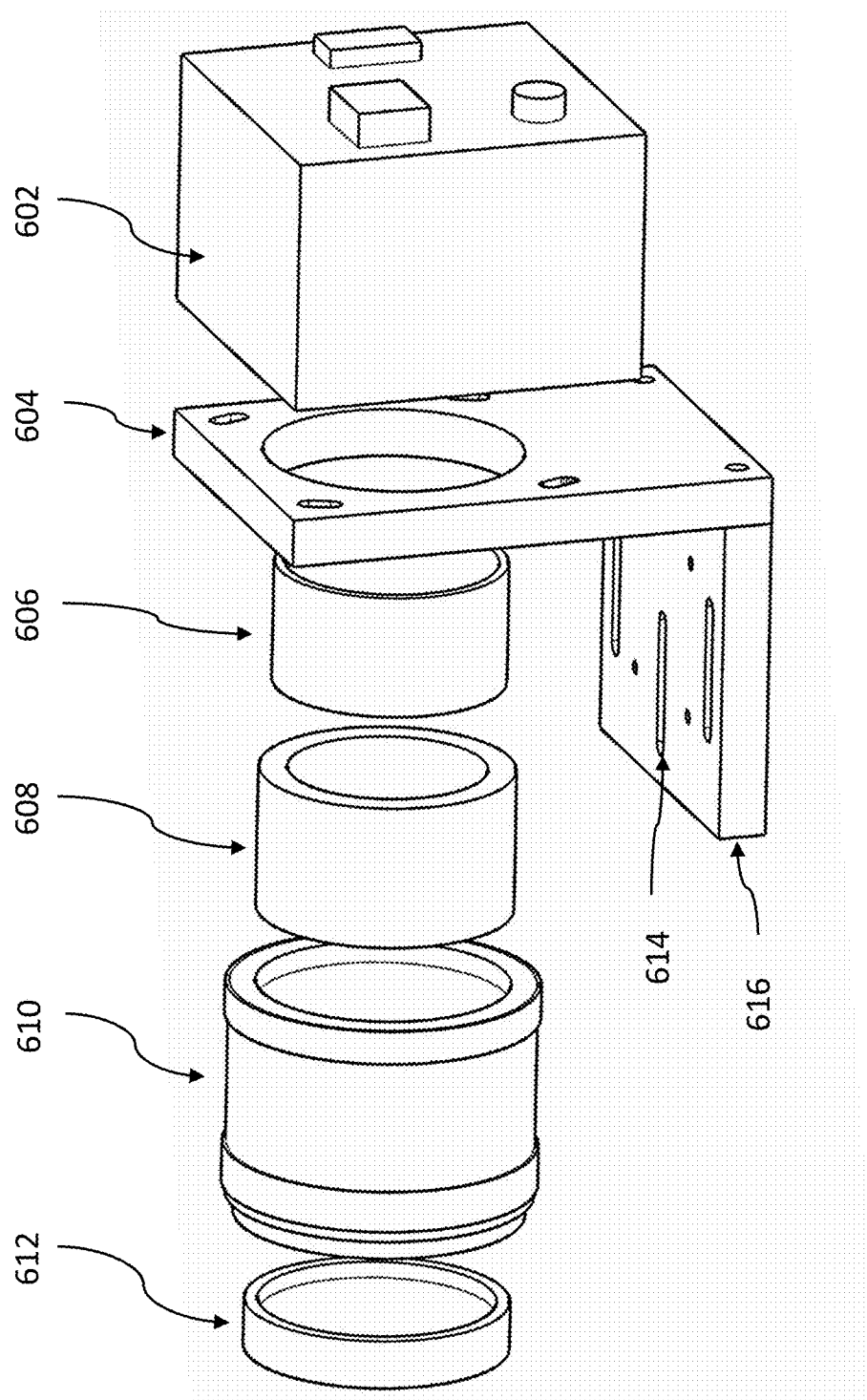
FIG. 6 illustrates an exemplary camera and lens configuration of an optical image acquisition unit, in accordance with an embodiment of the present disclosure.

Referring now to FIG. 6, an exemplary camera and lens mounting configuration of an optical image acquisition unit (for example, the optical image acquisition unit 200) is illustrated, in accordance with an embodiment of the present disclosure. The camera and lens mounting configuration includes a camera 602, a camera mount 604, an extension tube 606, a lens adapter 608, a lens 610, a diopter 612, adjustment slots 614, and a camera mount base 616.

The camera 602 may be a mono or a color line-scan camera. A line-scan camera sensor captures the image data one line at a time. It doesn't observe the image as a whole like an area sensor camera used in common photography cameras but captures it precisely line by line. This seamless recording method allows for imaging of continuous flowing material.

The camera may shut down at a temperature of about 60° C. Inside the optical image acquisition unit, water (or sample) may flow either way and the camera 602 may be selectable for scanning direction. In some embodiments, pixel size of the camera 602 may include 3.5 microns, 7 microns, 14 microns pixel or any other pixel size depending on application. It should be noted that the camera 602 may be of high resolution for fine detail for taxonomic classification and sizing of the small aquatic organisms.

In an embodiment, the camera 602 may include line scan up to 40,000 line scans/sec, 7 micron, 4 k pixel, and a primary magnification (Pmag) of 0.5, resulting in 14 μm object resolution. The camera 602 may also be designed for 14 μm, 2 k pixel line-scan camera, Pmag of 0.5, resulting in 28 μm object resolution.

The camera mount 604 may be changed depending on the selected camera 602. The camera mount 604 acts as a heat sink for the camera 602. Slotted base of the camera mount 604 with adjustment slots 614 provides adjustment for focus on field of view (FOV). In an embodiment, the camera mount 604 may include ⅜ in aluminum with 1" adjustment slots.

The extension tube 606 may be of variable length depending on the FOV. Further, the extension tube 606 may include threads dependent on selected camera (for example, M42). In an embodiment, the extension tube 606 may be 15 mm long. Type of the lens adapter 608 may be based on type of the lens 610. In an embodiment, the lens adapter 608 may be an F mount-adapter to M42 thread.

The lens 610 may be prime or telecentric. Manual focus of the lens 610 may typically be in a range of about 50 mm to about 135 mm. In an embodiment, the lens 610 may be a 50 mm prime lens, set at infinity focus and f22. The diopter 612 may be selected based on a targeted FOV. Strength of the diopter may be in a range of about 1.5 to about 10. In an embodiment, the camera and lens mounting configuration may not include any additional diopter lens.

Figure 7:
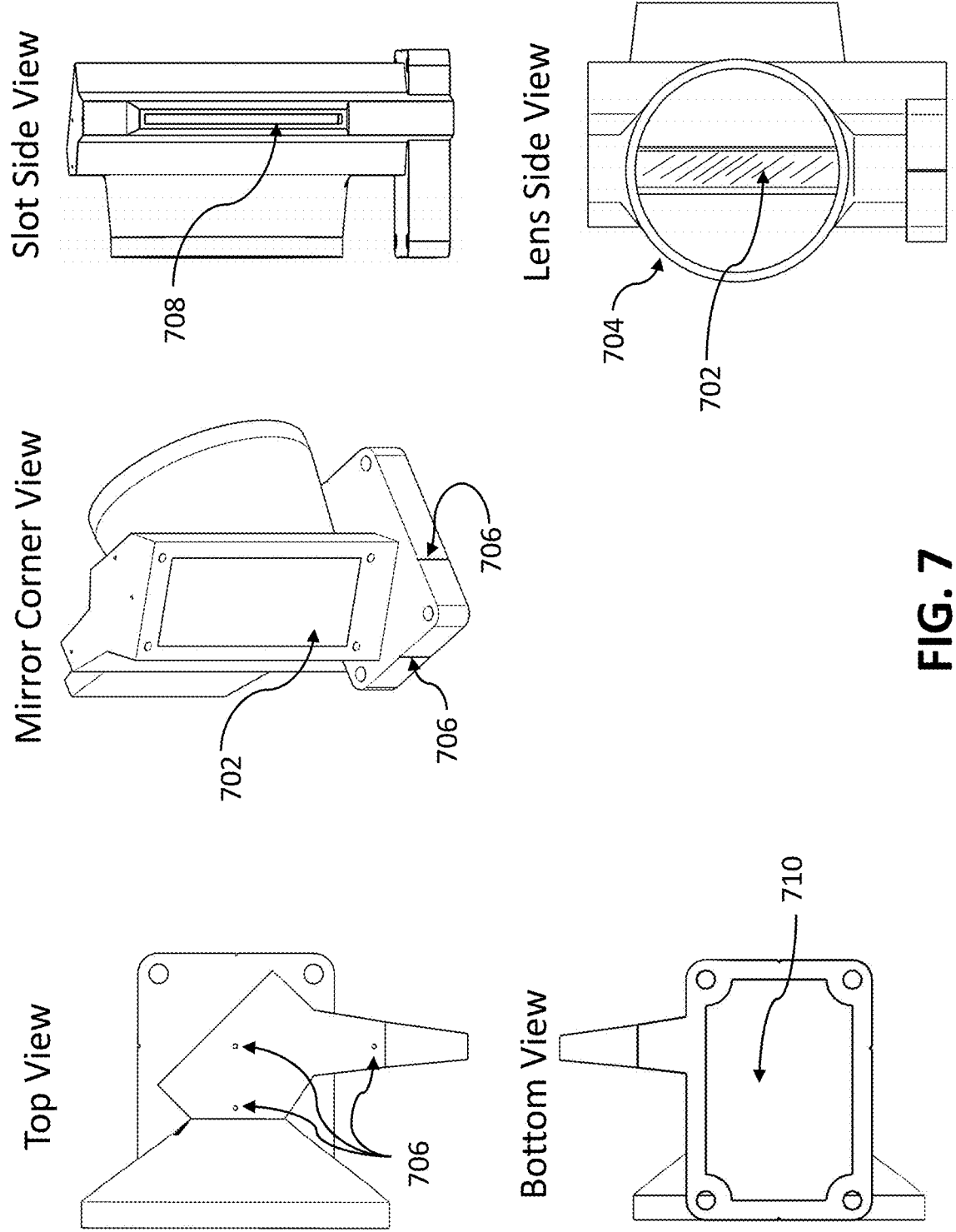
FIG. 7 illustrates multiple views of an exemplary mirror mount and lens shroud of an optical image acquisition unit, in accordance with an embodiment of the present disclosure.

Referring now to FIG. 7, multiple views of an exemplary mirror mount-lens shroud combination of an optical image acquisition unit (for example, the optical image acquisition unit 200) are illustrated, in accordance with an embodiment of the present disclosure. The mirror mount-lens shroud combination includes a mirror 702, a lens shroud 704, alignment marks 706, a line scan slot 708, and a base 710 with mounting holes.

The mirror mount and lens shroud may include variable size features to accommodate the mirror 702 and the lens 610, respectively. In an embodiment, the mirror mount and lens shroud may be designed for a 1" flow system with 53 mm FOV. The alignment marks 706 may be used for initial alignment. In an embodiment, alignment marks 706 may be at 6 locations.

The mirror 702 may be of many sizes and dimensions. In an embodiment, the mirror 702 is a one-eighth wave surface mirror and dimensions of the mirror 702 are 1"×3"×⅛". Using a high quality ⅛ wave (a measure of irregularity) first-surface (also known as front-surface) mirror minimizes degradation of reflected images. A first-surface mirror or front-surface mirror (also commonly abbreviated FS mirror or FSM) is a mirror with the reflective surface being above a backing, as opposed to the conventional, second-surface mirrors with the reflective surface behind a transparent substrate such as glass or acrylic.

The lens shroud 704 may be designed for multiple lens types. The lens shroud 704 prevents extraneous light from reaching camera sensor. In an embodiment, the lens shroud 704 may be designed for Nikon 50 mm prime lens with an opening ID of 65 mm.

The line scan slot 708 may be a slotted section for line scan, preventing reflections off the imaging window from reaching camera sensor. Further, the line scan slot 708 may be of many sizes depending on FOV. In an embodiment, dimensions of the line scan slot 704 may be 61 mm×3 mm.

Figure 8:
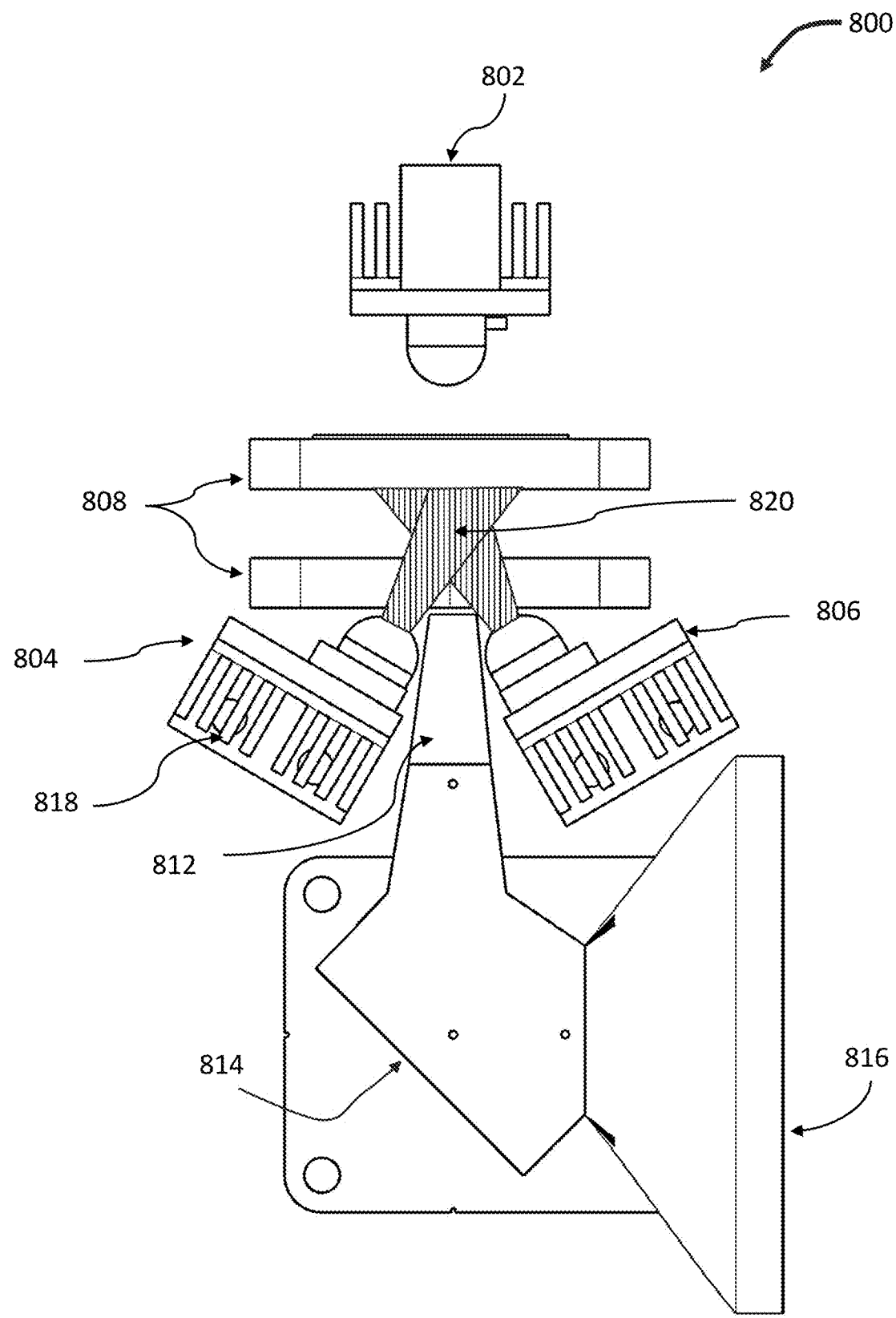
FIG. 8 illustrates an exemplary illumination assembly of an optical image acquisition unit, in accordance with an embodiment of the present disclosure.

Referring now to FIG. 8, an exemplary illumination assembly 800 of an optical image acquisition unit (for example, the optical image acquisition unit 200) is illustrated, in accordance with an embodiment of the present disclosure. The illumination assembly 800 includes a back light assembly 802, a first front light assembly 804, and a second front light assembly 806. The illumination assembly 800 further includes two clear windows 808 positioned opposite to each other, a diffuser 810, a line scan slot section 812, a first-surface mirror 814 (for example, a one-eighth wave first-surface mirror), and a lens shroud 816.

The illumination assembly 800 further includes a plurality of heat dissipators 818 affixed on to each of the back light assembly 802, the first front light assembly 804, and the second front light assembly 806. In an embodiment, the heat dissipators 818 may be in form of aluminum fins.

Further, the illumination assembly 800 includes a depth of field illumination range 820 between the two clear windows 808 for specular reflection off objects passing through the imaging flow chamber. In an embodiment, the depth of field is about 10 mm. The line scan slot section 812 prevents reflections off the windows 808 from reaching camera sensor. Additionally, the lens shroud 816 further prevents extraneous light from reaching camera sensor.

Light from the backlight assembly 802 focusses a line of light on the diffuser 810, resulting in a flat visibility curve for silhouette imaging. It should be noted that light intensity from the backlight assembly 802 and the front light assemblies 804 and 806 may be adjustable to provide an appropriate balance. Additionally, light from the front light assemblies 804 and 806 provides detail of objects through specular reflection. The light from the backlight assembly 802 upon passing through the diffuser 810 may provide a viewing background and whenever a small aquatic organism may pass through the depth of field between the clear windows 808, it will reflect the light from the front light assemblies 804 and 806 falling on its surface. The reflected light will reach the surface mirror 814 which will reflect the light towards the camera and lens assembly.

Figure 9:
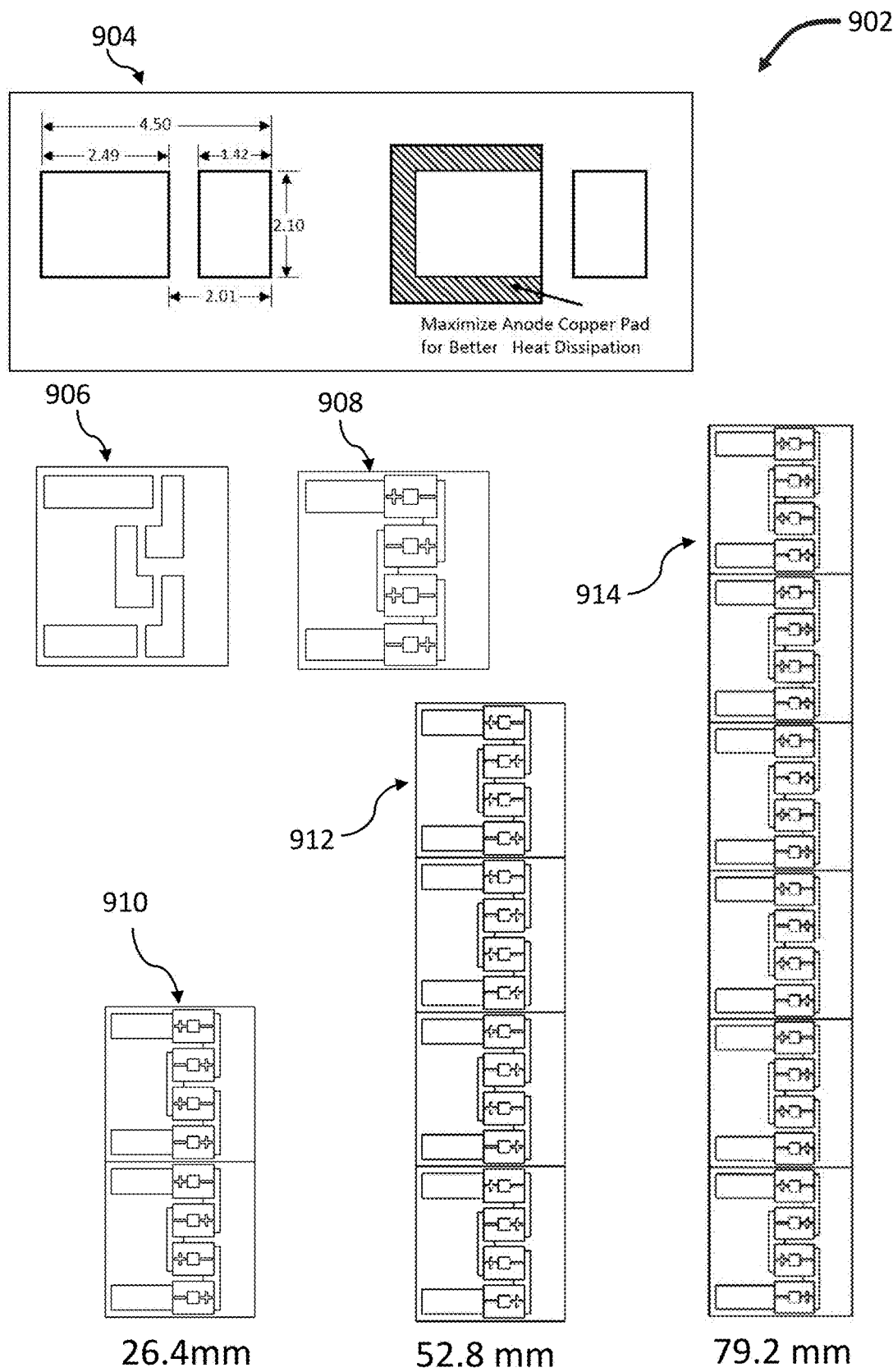
FIG. 9 illustrates an exemplary Light Emitting Diode (LED) module of an illumination assembly, in accordance with an embodiment of the present disclosure.

Referring now to FIG. 9, an exemplary Light Emitting Diode (LED) module 902 of an illumination assembly (for example, the illumination assembly 800) is illustrated, in accordance with an embodiment of the present disclosure. The LED module 902 may include a minimum pad layout 904. As will be appreciated, anode copper pad area needs to be maximized for better heat dissipation. For each pad layout, a corresponding LED orientation may be determined when affixing the LEDs upon the pad layout (for example, for a pad layout 906 for 4 LEDs, an LED orientation 908 may be suitable).

The LED module 902 may be configured in various shapes, sizes, and orientations (for example, a 26.4 mm LED strip 910, a 52.8 mm LED strip 912, and a 79.2 mm LED strip 914). It should be noted that the 26.4 mm LED strip 910 includes 8 LEDs, the 52.8 mm LED strip 912 includes 16 LEDs, and the 79.2 mm LED strip 914 includes 24 LEDs.

Figure 10:
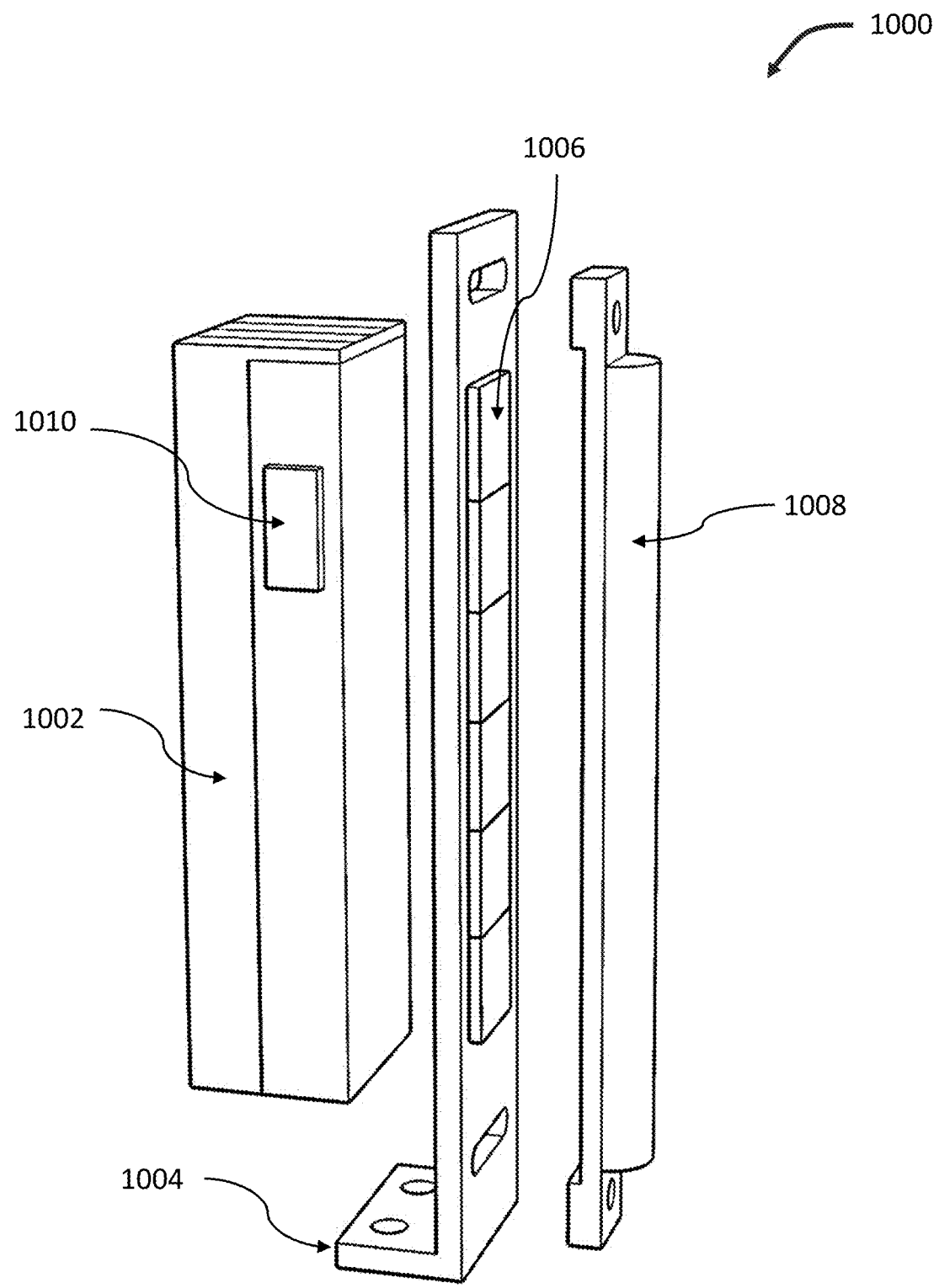
FIG. 10 illustrates an exemplary front light configuration of an illumination assembly, in accordance with an embodiment of the present disclosure.

Referring now to FIG. 10, an exemplary front light assembly 1000 of an illumination assembly (for example, the illumination assembly 800) is illustrated, in accordance with an embodiment of the present disclosure. The front light assembly 1000 includes a heat sink 1002, a mounting bracket 1004, an LED array 1006, a linear lens 1008 and a thermal switch 1010.

The heat sink 1002 may include aluminum fins. Alternately, the heat sink 1002 may include a connection to a thermal transfer device. The heat sink 1002 may be of many sizes and orientations (H fins, V fins, airfoil-shaped fins, etc.) depending on thermal management method. The heat sink 1002 may also use water cooling techniques.

The heat sink 1002 is further associated with a thermal switch 1010 that shuts off current at a temperature of about 60° C. In an embodiment, dimensions of the heat sink 1002 may be 100 mm×25 mm×10 mm. Additionally, the heat sink 1002 may use small turbo fans to circulate ambient temperature, pulling air off the imaging flow chamber. The imaging flow chamber with water flow keeps ambient temperature at about 50° C. or below.

The mounting bracket 1004 may be made of aluminum material. In an embodiment, dimensions of the mounting bracket 1004 may be 5"×1"×⅛". The LED array 1006 may be a 26.4 mm LED strip 910, a 52.8 mm LED strip 912, and a 79.2 mm LED strip 914, or any other customized LED strip.

The linear lens 1008 may be used for creating a line of light across the FOV and through the depth of field (DOF). It should be noted that LEDs have about 120° spread. The linear lens 1008, through internal reflection, focusses the light to a line (approximately from 120 degrees to 30 degrees) to increase the intensity of the light.

Figure 11:
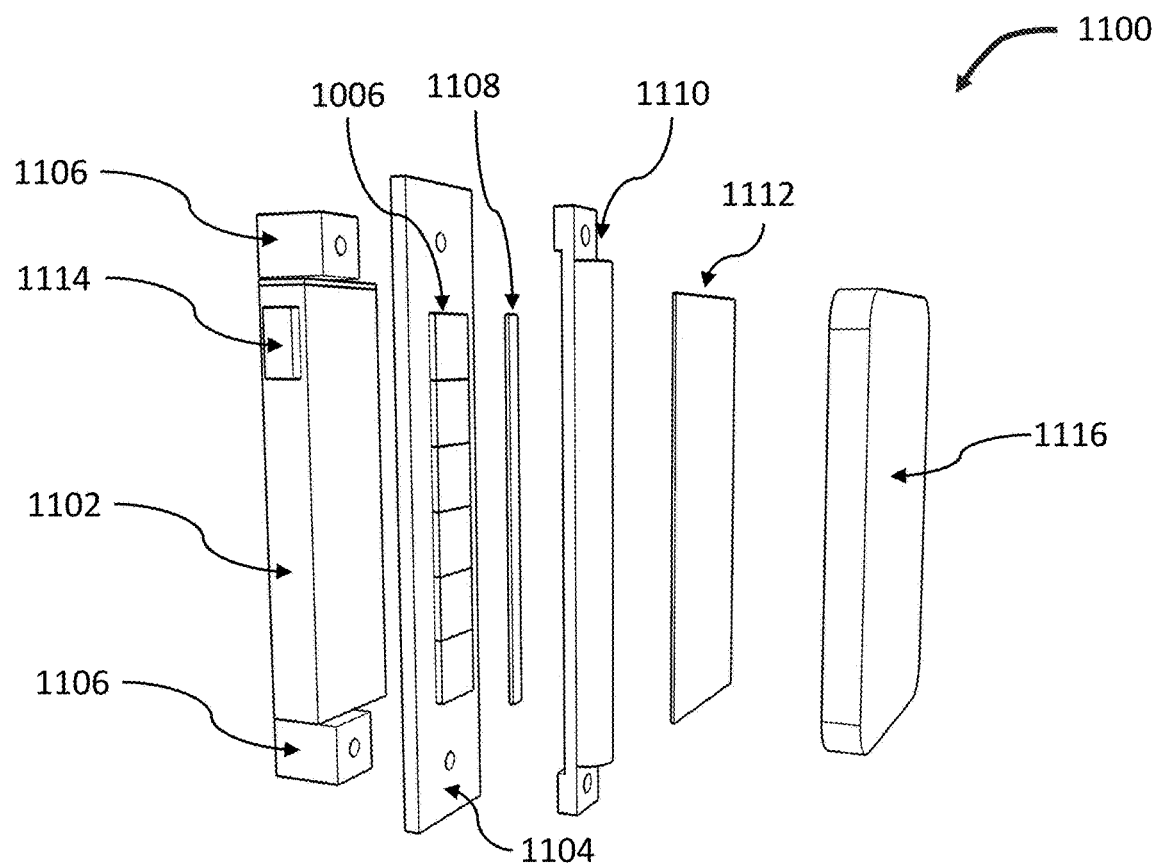
FIG. 11 illustrates an exemplary back light configuration of an illumination assembly, in accordance with an embodiment of the present disclosure.

Referring now to FIG. 11, an exemplary back light assembly 1100 of an illumination assembly (for example, the illumination assembly 800) is illustrated, in accordance with an embodiment of the present disclosure. The back light assembly 1100 includes an LED array 1006, a heat sink 1102, a mounting plate 1104 with mounted LED array 1006, a mounting spacer 1106, a prismatic film 1108, a linear lens 1110, a diffuser 1112, a thermal switch 1114, and a window.

The heat sink 1102 may include aluminum fins. Alternately, the heat sink 1102 may include a connection to a thermal transfer device. The heat sink 1102 may be of diverse sizes and orientations (H fins, V fins, airfoil-shaped fins, etc.) depending on thermal management method. The heat sink 1102 may also use water cooling techniques. Alternatively, other liquids or fluids may be used for cooling.

The heat sink 1102 is further associated with a thermal switch 1010 that shuts off current at a temperature of about 60° C. In an embodiment, dimensions of the heat sink 1002 may be 100 mm×25 mm×10 mm. Additionally, the heat sink 1102 may use small turbo fans to circulate ambient temperature, pulling air off the imaging flow chamber. The imaging flow chamber with water flow keeps ambient temperature at about 50° C. or below.

The mounting plate 1104 may be made of aluminum material. In an embodiment, dimensions of the mounting plate 1104 may be 5"×1"×⅛". The mounting spacer 1106 may be mounted via 6-32 screws, to chassis/enclosure back panel. Mounting allows alignment access from exterior via access panel. The mounting spacer 1106 may be made of aluminum or PVC. In an embodiment, the mounting spacer 1106 may be a PVC block with heat staked brass treaded inserts. The prismatic film 1108 may be used to further distribute light vertically prior to the linear lens 1110.

The linear lens 1110 may be used for creating a line of light. It should be noted that LEDs have about 120° spread. The linear lens 1110, through internal reflection, focusses the light to a line to increase the intensity of the light. Focal length of the linear lens 1110 may be designed to create a 60 mm extensive line of light on the diffuser 1112. Such line of light is required for silhouette imaging applications.

The diffuser 1112 may be made of a moderate diffuser material. In some embodiments, the diffuser 1112 may be used in combination with other diffusers and prismatic filters. The diffuser is attached to an imaging window (e.g., the distal window 1116) with a double side clear tape on each edge (for example, 3M VHS double side clear tape). It must be noted that the double side clear tape is not in viewing area. In an embodiment, the diffuser 1112 may be made of diffusion gels (for example, a tough white diffusion gel). The diffuser 1112 may be a moderate diffuser that creates an even field of light with minimal color temperature shift and includes a tough, heat resistant base.

Figure 12:
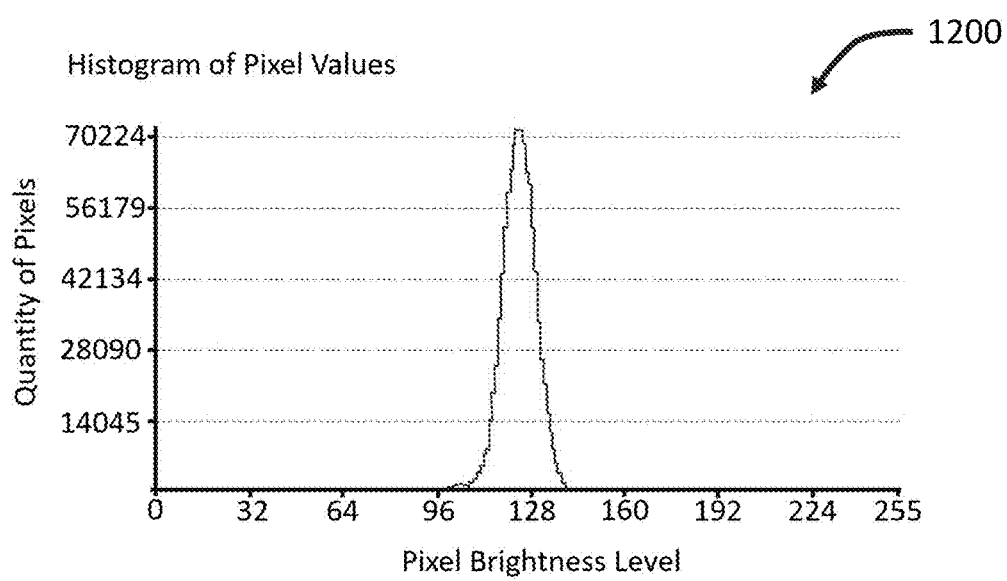
FIG. 12 is a graph representing pixel intensity distribution of light upon passing through a diffuser, in accordance with an embodiment of the present disclosure.
Figure 13:
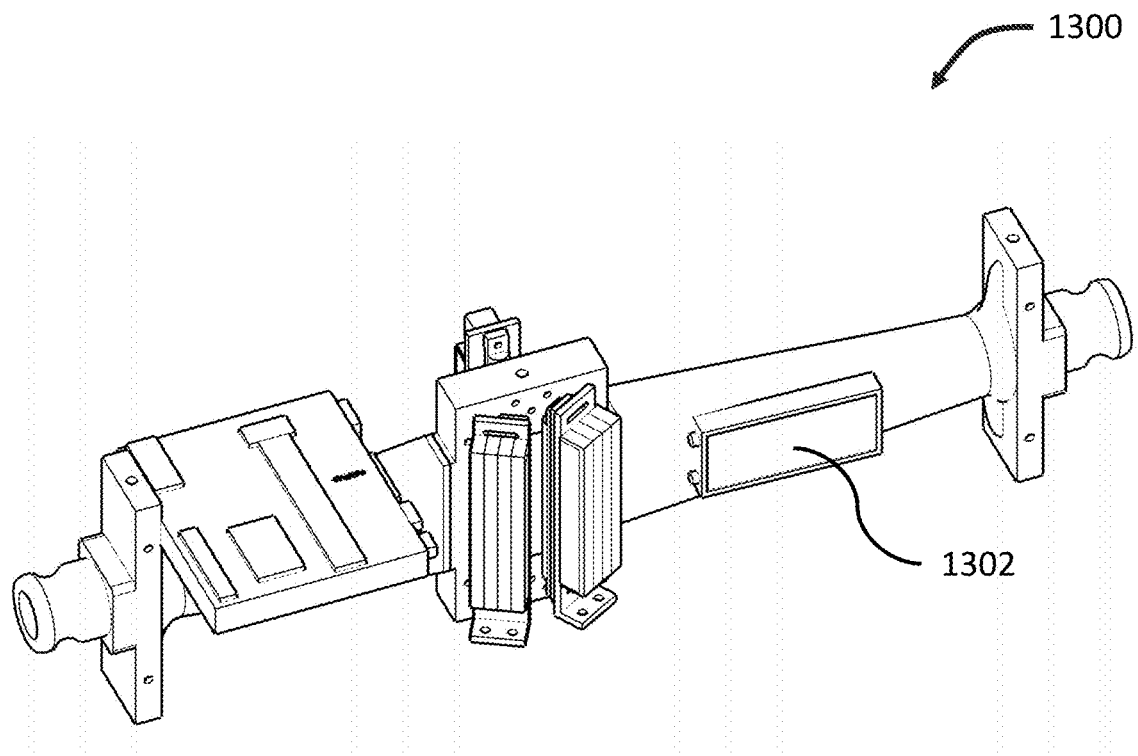
FIG. 13 illustrates an exemplary thermal management unit of an optical image acquisition unit, in accordance with an embodiment of the present disclosure.

Referring now to FIG. 12, a graph 1200 representing pixel intensity distribution of light upon passing through a diffuser is illustrated, in accordance with an embodiment of the present disclosure. X-axis of the graph 1200 corresponds to pixel intensity (ranging from 0 to 255) and Y-axis of the graph 1200 corresponds to number of pixels in an image. The graph 1200 shows a narrow histogram with a peak in a mid-range intensity zone. This shows that the diffuser cancels out light with extreme intensity values (too dim and too bright) and provides light with mid-tone pixel intensity values. 98. Referring now to FIG. 13, an exemplary thermal management unit 1302 of an optical image acquisition unit (for example, the optical image acquisition unit 200) is illustrated, in accordance with an embodiment of the present disclosure. Thermal management of the optical image acquisition unit may include a combination of passive and active thermal management. In some embodiments, the thermal management may include use of turbo fans and a custom thermal transfer device (i.e., the thermal management unit 1302) to use water-flow to cool the LEDs and CPU to maintain ambient temperature at about 55° C. or below. Additionally, the thermal management may include use of thermal switches on each LED array in the LED module and in the ambient air to avoid overheating and as safety measure. Non-limiting examples of thermal management in some embodiments are water flow along or around or through the flow path or an arrangement in the internal unit such as a counter-current exchange system. Other examples are a metal thermal transfer block or device integrated into the design of the short or long flow chambers, or using heat-straps to the LED mounts.

Figure 14:
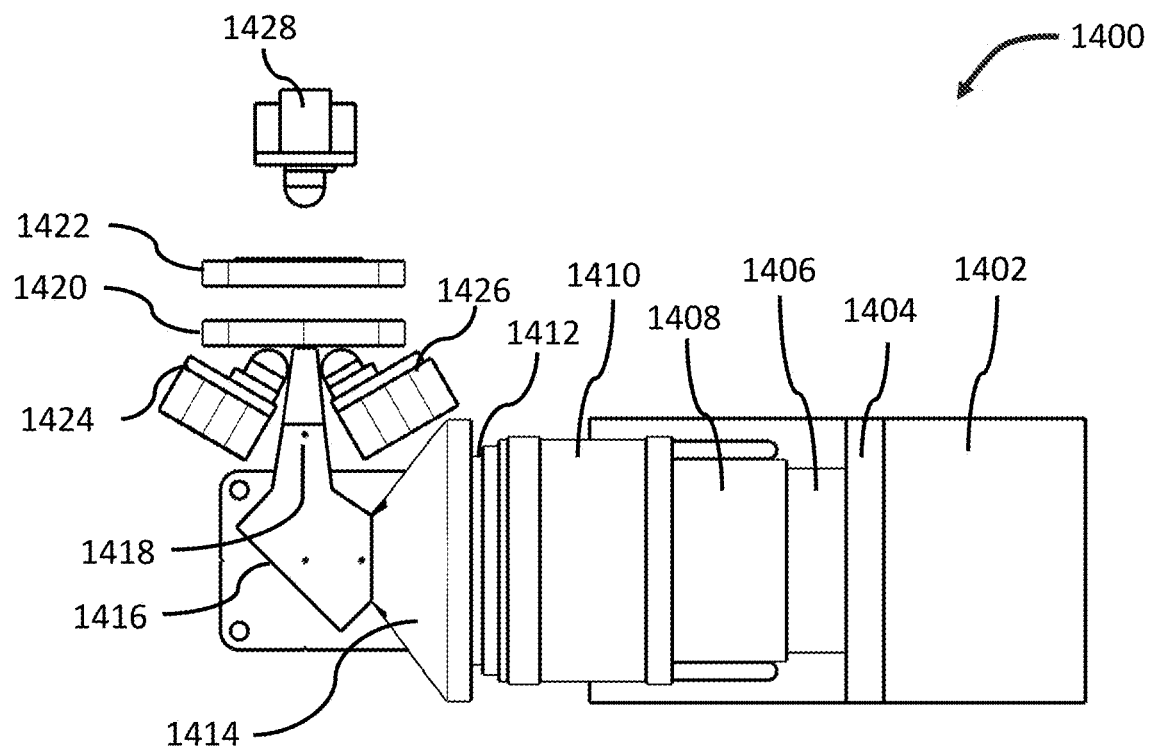
FIG. 14 illustrates a top view of an exemplary arrangement of a lens and camera assembly, a mirror and lens shroud assembly, and an illumination assembly of an optical image acquisition unit with respect to an imaging section, in accordance with an embodiment of the present disclosure.

Referring now to FIG. 14, a top view of an exemplary arrangement 1400 of a lens and camera assembly, a mirror and lens shroud assembly, and an illumination assembly of an optical image acquisition unit (for example, the optical image acquisition unit 200) with respect to an imaging section of an imaging flow chamber is illustrated, in accordance with an embodiment of the present disclosure.

The lens and camera assembly may include a camera 1402, a camera mount 1404, an extension tube 1406, a lens adapter 1408, a lens 1410. Further, the lens and camera assembly may or may not include a diopter 1412. The mirror and lens shroud assembly may include a lens shroud 1414, a first-surface mirror 1416, and a slotted section 1418. One of the diopter 1412 or the lens 1410 of the lens and camera assembly may be removably attached to the lens shroud 1414 of the mirror and lens shroud assembly through a locking means (e.g., snap fit, adjustment screws, etc.). The diopter and lens may lay or nest inside or near the edge of the shroud without touching it. In the embodiment shown in FIG. 14.

The imaging section may include a proximal window 1420 and a distal window 1422. In some embodiments, each of the proximal window 1420 and the distal window 1422 may be made of a transparent material (e.g., glass, acrylic, transparent plastic polymer, or the like). The sample may flow through a space or depth between the proximal window 1420 and the distal window 1422. Therefore, each of the proximal window 1420 and the distal window 1422 has a sample contacting side, i.e., side in contact with the sample and a non-contacting side, i.e., side not in contact with the sample. The slotted section 1418 of the mirror and lens shroud assembly may be connected to the non-contacting side of the proximal window 1420. In an embodiment, the slotted section 1418 may be removably attached to the non-contacting side of the proximal window 1420 for example, via snap fit mechanism, adjustment screws, or any other locking mechanism. Alternatively, the slotted section 1418 may be attached to the non-contacting side of the proximal window 1420 through permanent means such as, welding, permanent adhesive, or the like. Alternatively, the slotted section may be simply placed in contact to the non-contacting side of the proximal window.

The illumination assembly may include a first front light assembly 1424, a second front light assembly 1426, and a back light assembly 1428. Each of the first front light assembly 1424 and the second front light assembly 1426 may be positioned towards non-contacting side of the proximal window 1420. The back light assembly may be positioned towards non-contacting side of the distal window 1422. Light from each of the first front light assembly 1424 and the second front light assembly 1426 may be directed towards the sample through the proximal window 1420 and light from the back light assembly 1428 may be directed towards the sample through the distal window 1424. Additionally, the non-contacting side of the distal window 1422 may be coated or covered with a diffuser material.

When an aquatic organism in the sample may pass through the imaging section, light from each of the first front light assembly 1424 and the second front light assembly 1426 may be reflected by the aquatic organism via specular reflection. Light from the back light assembly 1428, falling on the diffuser material, may provide a highly contrasting background to the aquatic organism with a consistent edge definition for silhouette imaging. Further, the reflected light may pass through the slotted section 1418 of the mirror assembly and fall upon the first-surface mirror 1416. It should be noted that the first-surface mirror 1416 may be positioned at an optimal angle to reflect the light received through the slotted section 1418 towards the lens and camera assembly. Thus, the light reflected by the aquatic organism may be captured by the camera 1402.

Figure 15:
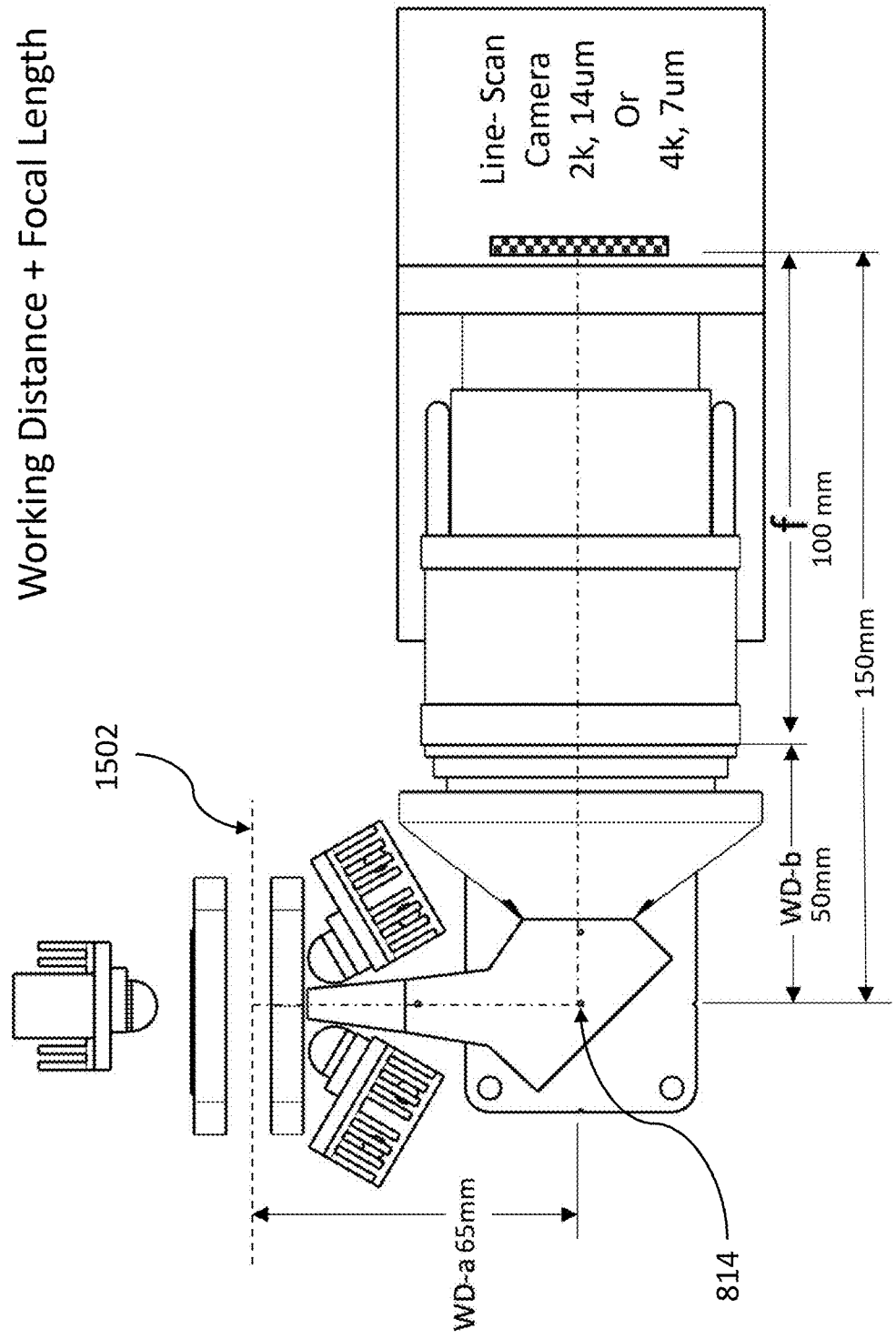
FIG. 15 illustrates calculation of an exemplary optical path of an optical image acquisition unit, in accordance with an embodiment of the present disclosure.

Referring now to FIG. 15, calculation of an exemplary optical path of an optical image acquisition unit (for example, the optical image acquisition unit 200) is illustrated, in accordance with an embodiment of the present disclosure. The optical path includes a shooting distance, which is calculated based on a total working distance (i.e., distance between front edge of the lens and surface of specimen) and the focal length of the lens. By way of an example, the focal length of the lens is 100 mm.

$$\text{Shooting distance} = \text{working distance} + \text{focal length} \qquad (1)$$

The total working distance may include two components. First component (WD-a) be calculated as a distance between center of the imaging flow channel 1502 and the surface mirror 814. Second component (WD-b) may be calculated as a distance between the surface mirror 814 and the lens.

$$\text{Total working distance} = WD - a + WD - b \qquad (2)$$

Desired Magnification Calculation $$\text{Sensor size required for ``}x\text{'' k by ``}y\text{'' } \mu m \text{ pixels} = xy \qquad (3)$$

For example, the sensor size required for 4 k by 7 µm pixels is 28 mm and the sensor size required for 2 k×14 µm is 28 mm.

$$Pmag = \text{Sensor size (in } \mu m)/\text{Field of View (in } \mu m) \qquad (4)$$

For example, Pmag for 28 mm with 53 mm FOV is 0.53.
Extension Tube Size Calculation
With the focus ring set at infinity, the extension tube size requirement may be calculated as per below equation.

$$\text{Extension (adapter + extension)} = \text{Focal Length} \times \text{Magnification} \qquad (5)$$

In continuation of the above example, total extension required is 0.53*100, i.e., 53 mm.
Therefore, size of extension tube required, 53-40 mm=13 mm. Hence, a 15 mm extension tube may be used.
It should be noted that size and spacing of each element will vary depending on lens type, sensor size, field of view, and focal length.
Minimum Resolvable Spot Calculation
To calculate the minimum resolvable spot that can be seen on the object,
Calculate Primary Magnification (PMAG) of the system, i.e., ratio of the field of view to the sensor size.

$$Pmag = \text{Sensor size (in } \mu m)/\text{Field of View (in } \mu m) \qquad (4)$$

Calculate the Object Resolution.
Object space resolution can be described in terms of line-pair per millimeter (LP/mm) or size, such as in microns, (µm). Image space resolution is the resolution of the line-scan sensor and may also be in terms of LP/mm or microns.

$$\text{Object Space Resolution } (LP/mm) = \qquad (5)$$
$$\text{Image Space Resolution } (LP/mm) \times PMAG$$

$$\text{Object Space Resolution } (\mu m) = \qquad (6)$$
$$(1000 \ \mu m/mm) / (2 \ X \ \text{Object Space Resolution } LP/mm)$$

OR $$\text{Object Space Resolution } (\mu m) = \qquad (7)$$
$$\text{camera pixel size } (\mu m)/PMAG \text{ of system}$$

Optical Image Acquisition Unit Calculations
By way of an example, for a system configuration with 2000, 14 µm pixel sensor, PMAG=0.53
Image space Resolution=14 µm or 35 LP/mm
Object Space Resolution=26.4 µm or 19 LP/mm
PMAG=(2000 pixels×14 µm/pixel)/FOV 53 mm/1000=0.53
Image Space Resolution (Camera) in LP/mm=1000 µm/mm/2× pixel size (µm)
Image Space Resolution=1000/(2×14)=35 LP/mm
Object Space Resolution=14 µm/0.53=26 µm
Object Resolution=35 LP/mm×0.53=19 LP/mm
By way of another example, for a system configuration with 4000, 7 µm pixel sensor, PMAG=0.53
Image space Resolution=7 µm or 71 LP/mm
Object Space Resolution=13.2 µm or 38 LP/mm
PMAG=(4000 pixels×7 µm/pixel)/FOV 53 mm/1000=0.53
Image Space Resolution (Camera) in LP/mm=1000 µm/mm/2× pixel size (µm)
Image Space Resolution=1000/(2×7)=71 LP/mm
Object Space Resolution=7 µm/0.53=13 µm
Object Resolution=71 LP/mm×0.53=38 LP/mm It should be noted that object resolution as calculated above is based solely on the camera sensor and FOV. As such, this is the theoretical resolution. Ability to resolve the LP/mm and object features depends on various optical quality considerations, lighting, types of lenses, Modulation Transfer Function (MTF), Nyquist Limit, the Airy disk, F #, etc. Lenses may include but is not limited to custom designs, specialty, micro, macro, zoom, telephoto, wide-angle, prime and telecentric. These must all be taken into consideration in determining the quality of the image throughout the Depth of Field in actual practice. Therefore, the optical image acquisition unit may successfully resolve (using a line pairs per millimeter scale represented as LP/mm) images to 14 LP/mm with the 2 k, 14 µm camera and to 20 LP/mm with the 4 k, 7 µm camera. Object characteristics of small aquatic organisms down to the 1 mm range may be successful with both cameras. The 4 k camera may also include RGB color pixels, adding more identifiable information.

As will be appreciated, various line scan cameras are available on the market. Line scan camera features, sensitivity, scan rate, pixel size, density, etc., are constantly changing and improving. The optical image acquisition unit may be adapted for such changes and to meet specific requirements. The optical image acquisition unit may be configured to work with either Gigabit Ethernet or Camera Link, or other future advancements which may provide higher scan rates.

In an embodiment, the optical image acquisition unit may provide an option of using one of two Giga Bit Ethernet Line-scan camera models, a mono/gray scale 4 k, 14-µm pixel capable of up to 36,000 scans per second, and a color 4 k, 7 µm color line-scan camera capable of 40,000 line scans/sec in turbo mode.

The scan rate required for various flow rates is provided in the below table.

TABLE 1

Required scan rate by the camera at various flow rates of the sample.

| Flow Rate | | | | Cubic | Velocity | | Required Scan Rate Scans/sec | |
|---|---|---|---|---|---|---|---|---|
| | | | | | | | 2k, 14 | 4k, 7 |
| gal/min | gal/hr | liter/min | liter/hr | m/s | m/sec | ft/sec | μm | μm |
| 0.10 | 6.00 | 0.38 | 22.71 | 6.3E−06 | 0.012 | 0.04 | 470 | 940 |
| 0.50 | 30.00 | 1.89 | 113.56 | 3.2E−05 | 0.062 | 0.20 | 2,349 | 4,698 |
| 0.75 | 45.00 | 2.84 | 170.34 | 4.7E−05 | 0.093 | 0.31 | 3,524 | 7,048 |
| 1.00 | 60.00 | 3.79 | 227.12 | 6.3E−05 | 0.125 | 0.41 | 4,698 | 9,397 |
| 1.25 | 75.00 | 4.73 | 283.91 | 7.9E−05 | 0.156 | 0.51 | 5,873 | 11,746 |
| 1.50 | 90.00 | 5.68 | 340.69 | 9.5E−05 | 0.187 | 0.61 | 7,048 | 14,095 |
| 1.75 | 105.00 | 6.62 | 397.47 | 1.1E−04 | 0.218 | 0.71 | 8,222 | 16,445 |
| 2.00 | 120.00 | 7.57 | 454.25 | 1.3E−04 | 0.249 | 0.82 | 9,397 | 18,794 |
| 2.25 | 135.00 | 8.52 | 511.03 | 1.4E−04 | 0.280 | 0.92 | 10,572 | 21,143 |
| 2.50 | 150.00 | 9.46 | 567.81 | 1.6E−04 | 0.311 | 1.02 | 11,746 | 23,492 |
| 2.75 | 165.00 | 10.41 | 624.59 | 1.7E−04 | 0.342 | 1.12 | 12,921 | 25,842 |
| 3.00 | 180.00 | 11.36 | 681.37 | 1.9E−04 | 0.374 | 1.23 | 14,095 | 28,191 |
| 3.25 | 195.00 | 12.30 | 738.16 | 2.1E−04 | 0.405 | 1.33 | 15,270 | 30,540 |
| 3.50 | 210.00 | 13.25 | 794.94 | 2.2E−04 | 0.436 | 1.43 | 16,445 | 32,889 |
| 3.75 | 225.00 | 14.20 | 851.72 | 2.4E−04 | 0.467 | 1.53 | 17,619 | 35,239 |
| 4.00 | 240.00 | 15.14 | 908.50 | 2.5E−04 | 0.498 | 1.63 | 18,794 | 37,588 |
| 4.25 | 255.00 | 16.09 | 965.28 | 2.7E−04 | 0.529 | 1.74 | 19,969 | 39,937 |
| 4.50 | 270.00 | 17.03 | 1022.06 | 2.8E−04 | 0.560 | 1.84 | 21,143 | 42,286 |
| 4.75 | 285.00 | 17.98 | 1078.84 | 3.0E−04 | 0.591 | 1.94 | 22,318 | 44,636 |
| 5.00 | 300.00 | 18.93 | 1135.62 | 3.2E−04 | 0.623 | 2.04 | 23,492 | 46,985 |
| 5.25 | 315.00 | 19.87 | 1192.40 | 3.3E−04 | 0.654 | 2.14 | 24,667 | 49,334 |
| 5.50 | 330.00 | 20.82 | 1249.19 | 3.5E−04 | 0.685 | 2.25 | 25,842 | 51,683 |
| 5.75 | 345.00 | 21.77 | 1305.97 | 3.6E−04 | 0.716 | 2.35 | 27,016 | 54,033 |
| 6.00 | 360.00 | 22.71 | 1362.75 | 3.8E−04 | 0.747 | 2.45 | 28,191 | 56,382 |
| 6.25 | 375.00 | 23.66 | 1419.53 | 3.9E−04 | 0.778 | 2.55 | 29,366 | 58,731 |
| 6.50 | 390.00 | 24.61 | 1476.31 | 4.1E−04 | 0.809 | 2.66 | 30,540 | 61,080 |
| 6.75 | 405.00 | 25.55 | 1533.09 | 4.3E−04 | 0.840 | 2.76 | 31,715 | 63,430 |
| 7.00 | 420.00 | 26.50 | 1589.87 | 4.4E−04 | 0.872 | 2.86 | 32,889 | 65,779 |
| 7.25 | 435.00 | 27.44 | 1646.65 | 4.6E−04 | 0.903 | 2.96 | 34,064 | 68,128 |
| 7.50 | 450.00 | 28.39 | 1703.44 | 4.7E−04 | 0.934 | 3.06 | 35,239 | 70,477 |
| 7.75 | 465.00 | 29.34 | 1760.22 | 4.9E−04 | 0.965 | 3.17 | 36,413 | 72,827 |

\* The velocity is based on flow rate through a 1" pipe.
\*\* Velocity = (4 × flow rate)/(π × (pipe diameter)$^2$)

Figure 16:
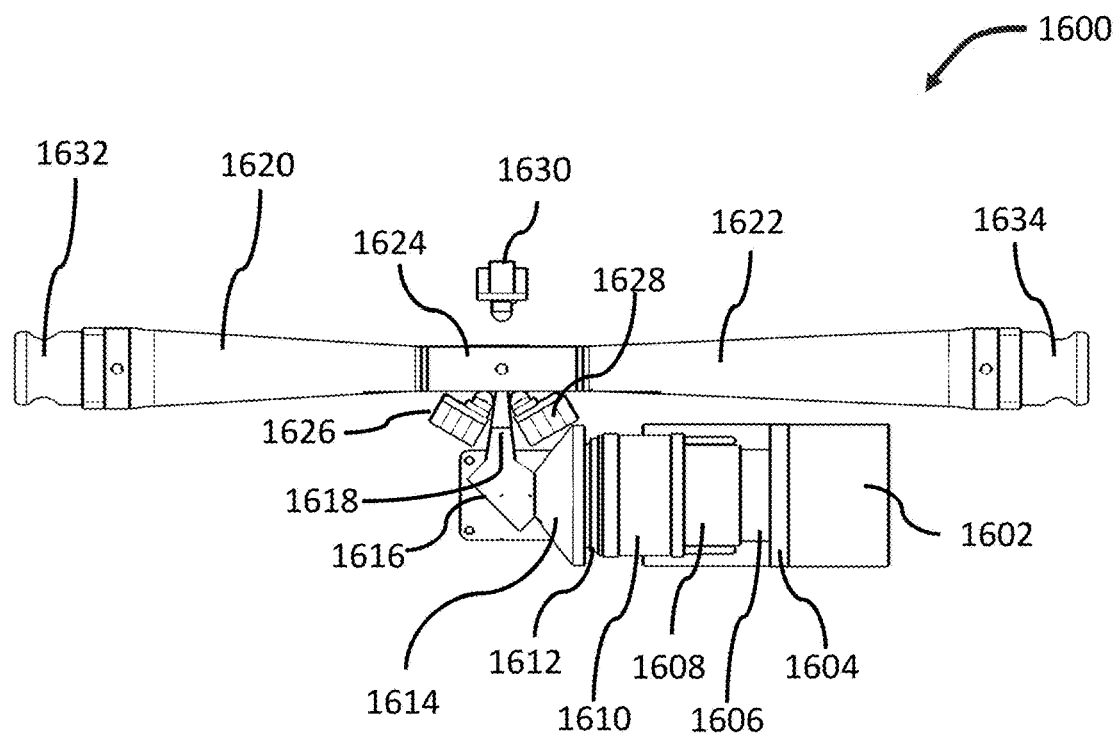
FIG. 16 illustrates multiples views of an exemplary arrangement of a lens and camera assembly and an illumination assembly of an optical image acquisition unit with respect to an imaging flow chamber, in accordance with an embodiment of the present disclosure.
Figure 16:
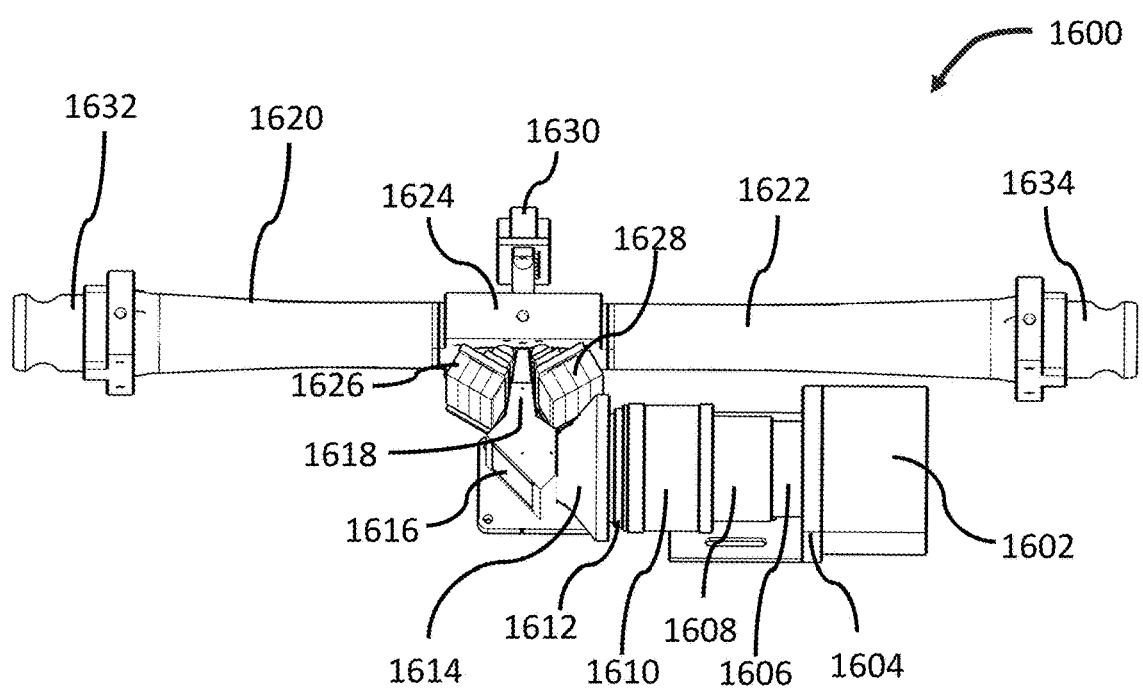

Referring now to FIG. 16, multiples views of an exemplary arrangement 1600 of a lens and camera assembly and an illumination assembly of an optical image acquisition unit (for example, the optical image acquisition unit 200) with respect to an imaging flow chamber are illustrated, in accordance with an embodiment of the present disclosure.

The lens and camera assembly may include a camera 1602, a camera mount 1604, an extension tube 1606, a lens adapter 1608, a lens 1610. Further, the lens and camera assembly may or may not include a diopter 1612. The mirror and lens shroud assembly may include a lens shroud 1614, a surface mirror 1616, and a slotted section 1618.

The imaging flow chamber may include a short flow chamber 1620, a long flow chamber 1622, and an imaging section 1624. The imaging section 1624 may include mount frames for two opposite transparent windows. The sample may flow through the imaging flow chamber and may be visible when flowing through the imaging section 1624 via the transparent windows. Therefore, the imaging section may have two sides external to each of the two transparent windows-one side is facing towards the first-surface mirror 1616 and other side is opposite to the mirror-facing side. The slotted section 1618 of the mirror and lens shroud assembly may be attached to the mirror-facing side of the imaging section 1624. In an embodiment, the slotted section 1618 may be removably attached to the imaging section 1624, for example, via snap fit mechanism, adjustment screws, or any other locking mechanism. Alternatively, the slotted section 1618 may be attached to the imaging section 1624 through permanent means such as, welding, permanent adhesive, or the like.

The illumination assembly may include a first front light assembly 1626, a second front light assembly 1628, and a back light assembly 1630. Each of the first front light assembly 1626 and the second front light assembly 1628 may be positioned towards mirror-facing side of the imaging section 1624. The back light assembly 1630 may positioned towards the side of the imaging section 1624 opposite to the surface mirror 1616. Light from each of the first front light assembly 1626, the second front light assembly 1628, and the back light assembly 1630 may be directed towards the sample through the imaging section 1624. Additionally, the side of the imaging section 1624 opposite to the surface mirror 1616 may be coated or covered with a diffuser material. 113. Additionally, the imaging flow chamber may include an inlet port end 1632 and an outlet port end 1634. The inlet port end 1632 may receive the sample. The sample may flow through the short flow chamber 1620, the imaging section 1624, and the long flow chamber 1622. From thereon, the sample may leave the imaging flow chamber via the outlet port end 1634. When an aquatic organism in the sample may pass through the imaging section, light from each of the first front light assembly 1626 and the second front light assembly 1628 may be reflected by the aquatic organism via specular reflection. Light from the back light assembly 1630, falling on the diffuser material, may provide a highly contrasting background to the aquatic organism with a consistent edge definition for silhouette imaging. Further, the reflected light may pass through the slotted section 1618 of the mirror assembly and fall upon the surface mirror 1616. It should be noted that the first-surface mirror 1616 may be positioned at an optimal angle to reflect the light received through the slotted section 1618 towards the lens and camera assembly. Thus, the light reflected by the aquatic organism may be captured by the camera 1602.

Figure 17:
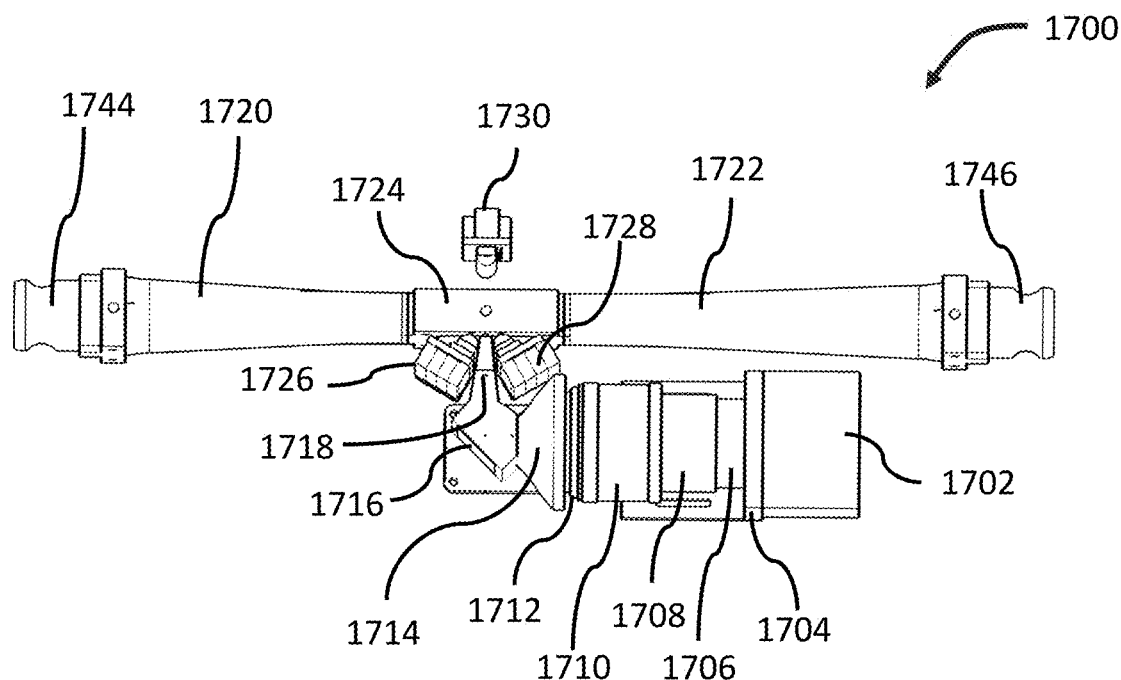
FIG. 17 illustrates multiples views of an exemplary arrangement of a lens and camera assembly and an illumination assembly of an optical image acquisition unit with respect to an imaging flow chamber, in accordance with an embodiment of the present disclosure.
Figure 17:
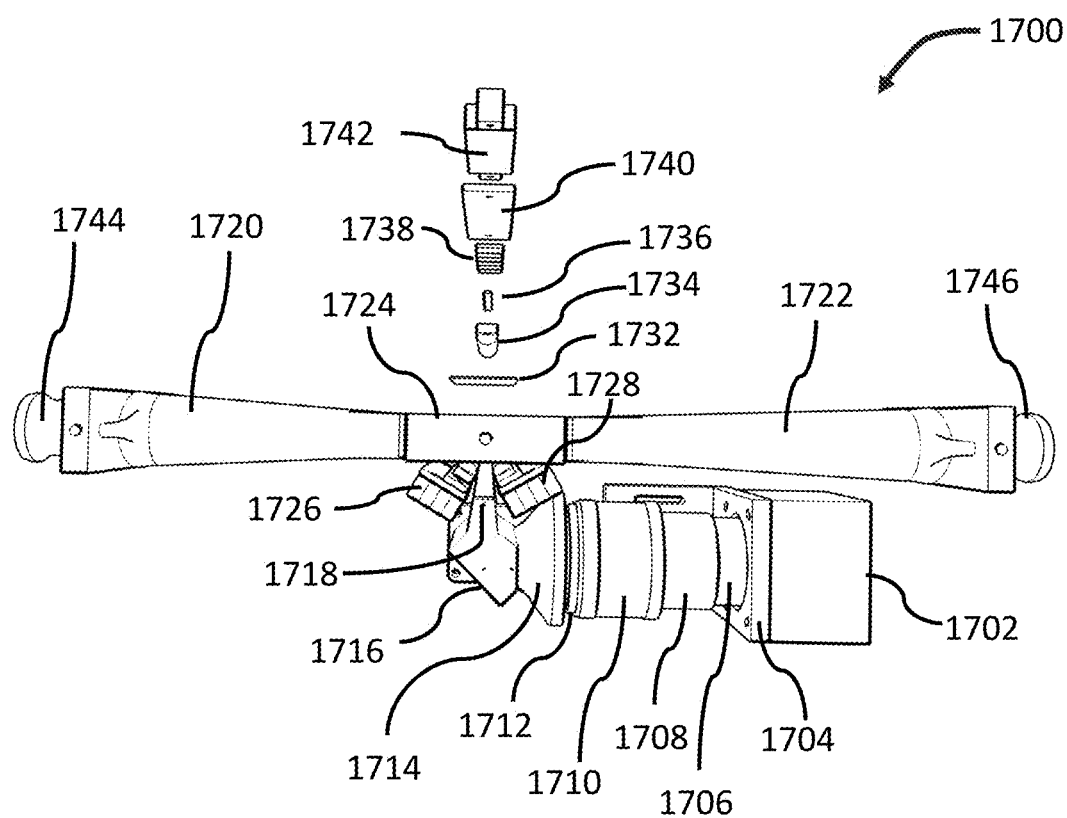

Referring now to FIG. 17, multiples views of an exemplary arrangement 1700 of a lens and camera assembly and an illumination assembly of an optical image acquisition unit (for example, the optical image acquisition unit 200) with respect to an imaging flow chamber are illustrated, in accordance with an embodiment of the present disclosure.

The lens and camera assembly may include a camera 1702, a camera mount 1704, an extension tube 1706, a lens adapter 1708, a lens 1710. Further, the lens and camera assembly may or may not include a diopter 1712. The mirror and lens shroud assembly may include a lens shroud 1714, a surface mirror 1716, and a slotted section 1718. One of the diopter 1712 or the lens 1710 of the lens and camera assembly may be removably attached to lens shroud 1714 of the mirror and lens shroud assembly through a locking means (e.g., snap fit, adjustment screws, etc.).

The imaging flow chamber may include a short flow chamber 1720, a long flow chamber 1722, and an imaging section 1724. The imaging section 1724 may include mount frames for two opposite transparent windows. The sample may flow through the imaging flow chamber and may be visible when flowing through the imaging section 1724 via the transparent windows. Therefore, the imaging section may have two sides external to each of the two transparent windows-one side is facing towards the surface mirror 1716 and other side is opposite to the mirror-facing side. The slotted section 1718 of the mirror and lens shroud assembly may be attached to the mirror-facing side of the imaging section 1724. In an embodiment, the slotted section 1718 may be removably attached to the imaging section 1724, for example, via snap fit mechanism, adjustment screws, or any other locking mechanism. Alternatively, the slotted section 1718 may be attached to the imaging section 1724 through permanent means such as, welding, permanent adhesive, or the like.

The illumination assembly may include a first front light assembly 1726, a second front light assembly 1728, and a back light assembly 1730. Each of the first front light assembly 1726 and the second front light assembly 1728 may be positioned towards mirror-facing side of the imaging section 1724. The back light assembly 1730 may positioned towards the side of the imaging section 1724 opposite to the surface mirror 1716. Light from each of the first front light assembly 1726, the second front light assembly 1728, and the back light assembly 1730 may be directed towards the sample through the imaging section 1724.

Additionally, the side of the imaging section 1724 opposite to the surface mirror 1716 may be coated or covered with a diffuser material 1732. The back light assembly 1730 may include a linear lens 1734, a prismatic film 1736, an LED array 1738, a mounting plate 1740, and a heatsink 1742. Each of the first front light assembly 1726 and the second front light assembly 1728 may include a similar arrangement of components except the prismatic film.

Additionally, the imaging flow chamber may include an inlet port end 1744 and an outlet port end 1746. The inlet port end 1744 may receive the sample. The sample may flow through the short flow chamber 1720, the imaging section 1724, and the long flow chamber 1722. From thereon, the sample may leave the imaging flow chamber via the outlet port end 1746. When an aquatic organism in the sample may pass through the imaging section, light from each of the first front light assembly 1726 and the second front light assembly 1728 may be reflected by the aquatic organism via specular reflection. Light from the back light assembly 1730, falling on the diffuser material, may provide a highly contrasting background to the aquatic organism with a consistent edge definition for silhouette imaging. Further, the reflected light may pass through the slotted section 1718 of the mirror assembly and fall upon the surface mirror 1716. It should be noted that the first-surface mirror 1716 may be positioned at an optimal angle to reflect the light received through the slotted section 1618 towards the lens and camera assembly. Thus, the light reflected by the aquatic organism may be captured by the camera 1702. In some embodiments and/or operational modes, water may be made to flow in the opposite direction and in those embodiments and/or those operational modes, the inlet port could serve as the outlet port and the outlet port could serve as the inlet port.

As will be appreciated by those skilled in the art, the techniques described in the various embodiments discussed above are not routine, or conventional, or well understood in the art. The techniques discussed above provide for imaging and classifying small aquatic organisms (length in the range of about 0.5 mm to about 50 mm and diameter in a range from about 0.5 mm to about 10 mm. The optical image acquisition unit disclosed above captures high resolution images in real-time. The optical image acquisition unit is compact and portable. Additionally, the optical image acquisition unit may be used in in situ as well as ex situ conditions. The optical image acquisition unit uses a tri light illumination assembly to detect small aquatic organisms through a combination of silhouette imaging and specular reflection of surface features. Further, the optical image acquisition unit provides means to classify the small aquatic organisms detected in the captured images.

The embodiments described herein are largely aimed at imaging small aquatic organisms that may range in size from about 0.5 mm to about 50 mm in length, and may range in width from about 0.5 mm to about 10 mm. Other embodiments could image smaller or larger aquatic organisms with same efficiencies by varying and adjusting the dimensions of the windows, dimensions of the inlet port, dimensions of the flow chamber or other components of the imaging system, optics, chamber, camera design and configuration based on the sizes of the target organisms.

Considering the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for intelligently imaging and classifying small aquatic organisms. The illustrated steps are set out to explain the exemplary embodiments shown, and it should be anticipated that ongoing technological development will change the way particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternative embodiments of the instrument disclosed herein may be built and used that may have other lower and/or upper limit for the size of organisms sampled that is different from the exemplary embodiments disclosed herein. (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. An image acquisition system for environmental sampling of aquatic organisms comprising:
   a fluid flow chamber comprising an inlet port end and an outlet port end;
   at least two clear or transparent windows positioned between the inlet port end and the outlet port end;
   a line scan camera configured to acquire images through one of the transparent windows, namely the proximal transparent window;
   an illuminating assembly comprising a first-surface mirror, a line scan slot section, a plurality of heat dissipators, a first front light assembly, a second front light assembly and a back light assembly, wherein the line scan slot section is placed in space between said first front light assembly and said second front light assembly;
   a diffuser element connected to one of the clear windows; and
   a back light window placed in between said clear windows and said diffuser element, wherein said back light window provides a surface to said diffuser element.

2. The image acquisition system of claim 1 wherein said fluid flow chamber further comprises a short flow chamber and a long flow chamber to modulate and maintain the fluid flow rates within said fluid flow chamber.

3. The image acquisition system of claim 1 wherein at least one of the plurality of said heat dissipators is attached to one or more of the the first front light assembly, the second front light assembly or the back light assembly.

4. The image acquisition system of claim 1 wherein the line scan camera is a kind of a colored line-scan camera.

5. The image acquisition system of claim 1, wherein the system can sample aquatic organisms that around 0.5 mm to around 50 mm size range.

6. The image acquisition system of claim 1 wherein the line scan camera is a kind of a colored line-scan camera to capture colored images of said aquatic organisms flowing through said fluid flow chamber.

7. A method for environmental sampling and classifying aquatic organisms, the method comprising:
   viewing from a transparent window said aquatic organisms floating within a fluid stream flowing through said fluid flow chamber;
   scanning and acquiring images of said aquatic organisms using a line scan camera connected to said fluid flow chamber; and
   classifying said aquatic organisms based on the acquired images; wherein the organisms are around 50 mm in size;
   wherein the line scan camera is part of an illuminating assembly comprising a first-surface mirror, a plurality of lighting assemblies, a plurality of clear windows to provide a reflection of said aquatic organisms passing through said fluid flow chamber, a line scan slot section and a plurality of heat dissipators;
   wherein said plurality of lighting assemblies further comprises a first front light assembly, a second front light assembly and a back light assembly;
   wherein the line scan slot section is placed in space between said first front light assembly and said second front light assembly.

8. The method of claim 7 wherein the back light assembly further comprises a back light window placed in between said transparent window and said diffuser element, wherein said back light window provides a surface to said diffuser.

* * * * *